(12) United States Patent
Milford et al.

(10) Patent No.: US 7,847,942 B1
(45) Date of Patent: Dec. 7, 2010

(54) PERIPHERAL INTERFACE DEVICE FOR COLOR RECOGNITION

(75) Inventors: Peter Milford, Los Gatos, CA (US);
Larry Lynch, Los Gatos, CA (US);
Richard Freeman, San Carlos, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 519 days.

(21) Appl. No.: 11/647,939

(22) Filed: Dec. 28, 2006

(51) Int. Cl.
*G01N 21/25* (2006.01)

(52) U.S. Cl. ...................................... 356/420; 235/469

(58) Field of Classification Search ......... 356/405–406, 356/420; 235/469
See application file for complete search history.

(56) References Cited

U.S. PATENT DOCUMENTS

| | | | |
|---|---|---|---|
| 4,603,976 A * | 8/1986 | Fetzer et al. ................. | 356/402 |
| 6,375,075 B1 * | 4/2002 | Ackley et al. .......... | 235/462.04 |
| 6,502,756 B1 | 1/2003 | Fåhraeus | |
| 2002/0159065 A1 * | 10/2002 | Berstis ....................... | 356/406 |
| 2002/0199149 A1 * | 12/2002 | Nagasaki et al. ............ | 714/752 |

FOREIGN PATENT DOCUMENTS

| | | |
|---|---|---|
| WO | WO0073983 A1 | 12/2000 |
| WO | WO0101670 A1 | 1/2001 |
| WO | WO0116691 A1 | 3/2001 |
| WO | WO0126032 A1 | 4/2001 |
| WO | WO0171473 A1 | 9/2001 |
| WO | WO0171475 A1 | 9/2001 |
| WO | WO0175723 A1 | 10/2001 |
| WO | WO0175773 A1 | 10/2001 |
| WO | WO0175780 A1 | 10/2001 |
| WO | WO0195559 A1 | 12/2001 |

* cited by examiner

*Primary Examiner*—Kara E Geisel

(57) ABSTRACT

A peripheral interface device for determining the color of a surface, where the surface color may then be used to determine device position and identify objects. Embodiments provide a device capable of directing different colors of light (e.g., red, green and blue) onto a surface and measuring relative intensities of the reflected colors to determine the color of the surface. The reflection and measurement of each color may be performed separately. Alternatively, composite-colored light may be directed at the surface, which may then be filtered to extract the different colors and enable measurement of their relative intensities. As such, the device can detect regions of a given color and regions of different shades of the same color, which may then be used to determine the position of the device and/or identify an object.

32 Claims, 17 Drawing Sheets

PERIPHERAL INTERFACE DEVICE FOR COLOR RECOGNITION

BACKGROUND OF THE INVENTION

Many hardware systems running software applications require some type of user input. While input peripherals once consisted primarily of joysticks and mice, modern systems require more advanced user inputs. For example, educational tools and other software applications invite users to interact with objects separate from the components of the system itself (e.g., a display screen coupled to the system, etc.), thereby necessitating additional inputs from peripherals designed to interact with the separate objects. Since numerous objects can be used with the system and the objects can be moved independently of the system, position determination and object identification have become important inputs to modern systems.

One conventional solution to position determination is the use of a coded dot pattern such as the products offered by the Anoto Group AB of Sweden. While the coded dot patterns may allow an input device to recognize a dot coding and identify its position on the pattern, the pattern itself provides no means for object identification. Additionally, both the pattern itself and the hardware for reading the pattern are complex and expensive to implement considering the cost of the optical sensors for reading the pattern, the cost of printing a usable pattern, etc.

Other conventional solutions involve the use of electrostatic and/or capacitive positioning. Similar to the coded dot patterns discussed above, electrostatic and capacitive positioning also lack means for object identification. Additionally, both technologies are expensive to implement and discourage use in small products given the large size of the required hardware.

SUMMARY OF THE INVENTION

Accordingly, a need exists for a peripheral interface device capable of both position determination and object identification. Further, a need exists for a peripheral interface device that is able to determine position and identify objects with reduced hardware size and cost. Embodiments of the present invention provide novel solutions to these needs and others as described below.

Embodiments of the present invention are directed towards a peripheral interface device for determining the color of a surface, where the surface color may then be used to determine device position and identify objects. More specifically, embodiments provide a device capable of directing different colors of light (e.g., red, green and blue) onto a surface and measuring relative intensities of the reflected colors to determine the color of the surface. The reflection and measurement of each color may be performed separately. Alternatively, composite-colored (e.g., white) light may be directed at the surface, which may then be filtered to extract the different colors and enable measurement of their relative intensities. As such, the device can detect regions of a given color (e.g., red, blue, yellow, black, white, etc.) and regions of different shades of the same color (e.g., pink, light blue, different grayscale shades, etc.), which may then be used to determine the position of the device (e.g., on a color-coded medium where the position of each colored region is known) and/or identify an object (e.g., comprising the colored region). Additionally, the device may comprise a lens for focusing the light emitted by or directed to the device, thereby adjusting the accuracy and/or sensitivity of the device. And further, the device may comprise at least one output device (e.g., display, lights, speaker, etc.) for providing output in response to a determined color, position and/or object.

In one embodiment, a pen-shaped electronic device includes an optical detector for detecting a color coding of a surface in proximity thereof. A memory is operable to store color coding information. The electronic device also includes a processor for accessing the memory and for accessing a portion of the color coding information identifying the color coding, the processor further for determining a position of the optical detector with respect to the surface based upon the identification of the color coding.

In another embodiment, a peripheral interface device includes at least one light source for directing a first light and a second light from the peripheral interface device onto a surface, the first light comprising a first color and the second light comprising a second color. At least one sensor is provided for sensing a first reflected light comprising a portion of the first light reflected from the surface, wherein the at least one sensor is operable to generate a first color measurement signal indicating an intensity of the first reflected light, the at least one sensor further for sensing a second reflected light comprising a portion of the second light reflected from the surface, and wherein the at least one sensor is further operable to generate a second color measurement signal indicating an intensity of the second reflected light. The peripheral interface device also includes a processor for accessing the first and second color measurement signals and determining the color of the surface based upon a relationship of the intensity of the first reflected light to the intensity of the second reflected light. And in one embodiment, a memory may be coupled to the processor for storing color-coded information for the surface. The processor is operable to access the color-coded information and identify a portion of the color-coded information associated with the determined color of the surface, the processor further for determining at least one of a position on the surface and an object comprising the surface based upon the identified portion of the color-coded information.

In yet another embodiment, a method for determining a color of a surface using a peripheral interface device includes directing a first light from the peripheral interface device onto a surface, the first light comprising a first color. In response to sensing a first reflected light comprising a portion of the first light reflected from the surface, a first color measurement signal is generated indicating an intensity of the first reflected light. A second light is directed from the peripheral interface device onto the surface, the second light comprising a second color. In response to sensing a second reflected light comprising a portion of the second light reflected from the surface, a second color measurement signal is generated indicating an intensity of the second reflected light. The first and second color measurement signals are accessed. The color of the surface is determined based upon a relationship of the intensity of the first reflected light to the intensity of the second reflected light. In another embodiment, color-coded information for the surface is stored. A portion of the color-coded information associated with the determined color of the surface is identified. At least one of a position on the surface and an object comprising the surface is determined based upon the identified portion of the color-coded information.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Embodiments of the Invention

Figure 1:
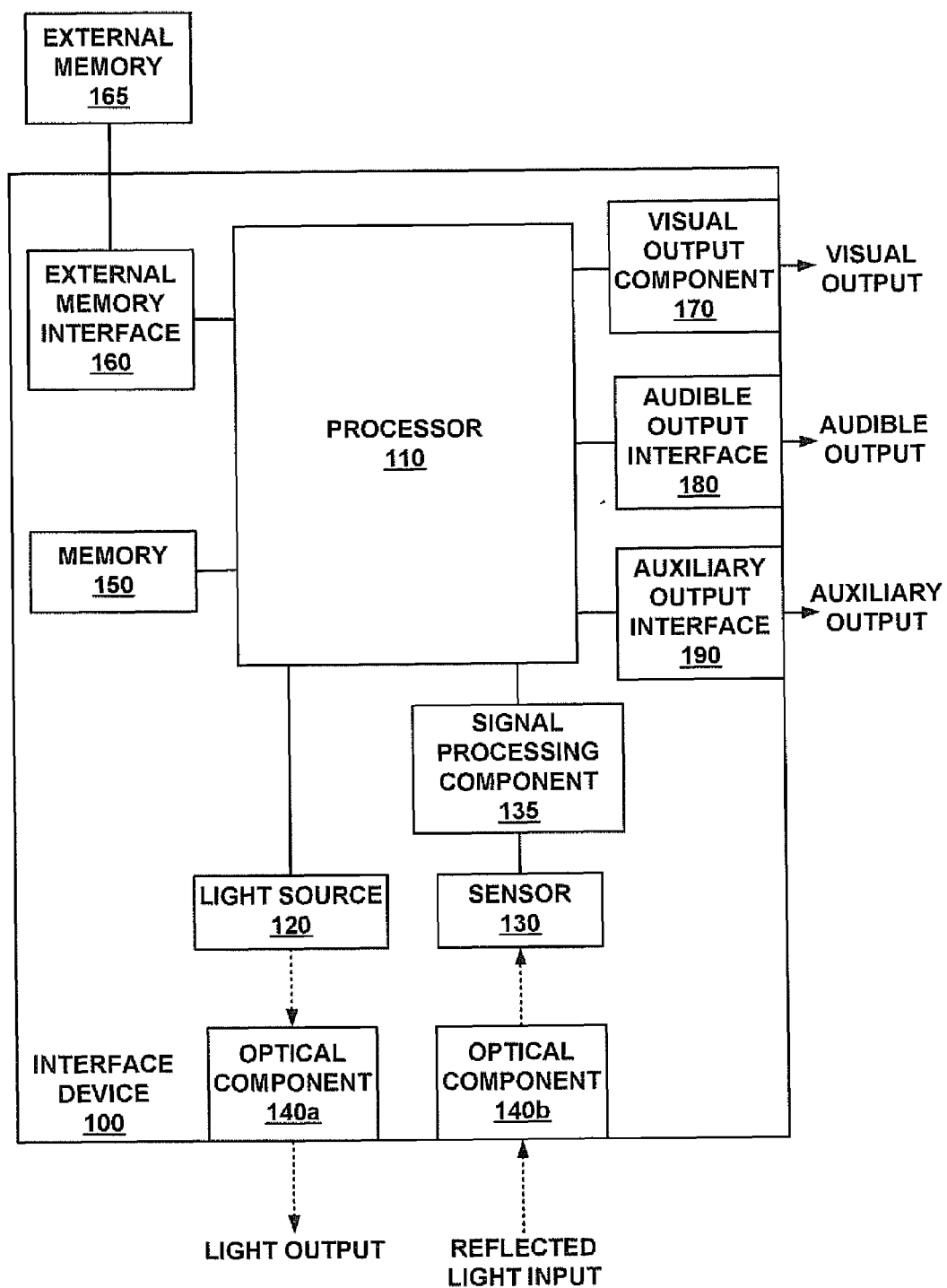
FIG. 1 shows an exemplary interface device in accordance with one embodiment of the present invention.

FIG. 1 shows exemplary interface device 100 in accordance with one embodiment of the present invention. As shown in FIG. 1, interface device 100 is operable to determine the color of a surface (e.g., a colored region of the surface) when device 100 is brought in proximity to the colored region, where the surface may be flat, spherical, or alternatively shaped/contoured. Color determination is performed by emitting light (depicted in FIG. 1 by dashed arrows) and measuring the portion of the light reflected off the colored region. Where the position of a colored region (e.g., with respect to other colored regions, other objects, etc.) is known or derivable, device 100 may determine its position based upon the determined color of the colored region. Alternatively, where a colored region is associated with an object (e.g., disposed thereon), device 100 may identify the object based upon the determined color of the associated colored region.

To measure the color (e.g., solid color, patterns comprising multiple colors, shades of a color, etc.) of the colored region, processor 110 can control light source 120 to emit at least one color of light directed toward the colored region. The duration of light source activation (e.g., when the light source is emitting light) may be varied, as well as the number of successive activations of light source 120. For example, light source 120 may be illuminated once for each color, strobed for each color, strobed for more than one color, etc. Sensor 130 may receive and measure (e.g., the intensity of) the reflected portion of the light from the colored region, where at least one color measurement signal (e.g., one for each color of light directed at the colored region) may be generated by sensor 130 and fed to processor 110 for determination of the color of the colored region. For example, if the intensity of red light reflected from the colored region is significantly higher than the intensity of blue or green light reflected from the colored region (e.g., as indicated by respective color measurement signals), then the color of the colored region may be determined to be red (or a shade thereof).

Sensor 130 may output either a digital or analog signal representing a color measurement. Where a digital signal is output, signal processing component 135 coupled between sensor 130 and processor 110 may perform pre-processing tasks on the signal to prepare for further processing by processor 110. Where an analog signal is output from sensor 130, component 135 may perform analog-to-digital conversion and/or other pre-processing tasks on the signal to prepare for further processing by processor 110.

Device 100 may determine color using one or more color systems or models (e.g., red-green-blue (RGB), cyan-magenta-yellow-black (CMYK), etc.), where each color channel of the color system may be individually directed toward the colored region. Device 100 may then measure (e.g., the intensity of) the reflected portion of light corresponding to each color channel to determine the color of the colored region. For example, when implementing an RGB measurement system, light source 120 may direct red light toward the colored region and sensor 130 may measure the portion of the red light reflected from the colored region. Device 100 may then direct (e.g., using light source 120) green light and measure (e.g., using sensor 130) the reflected portion thereof. Finally, blue light may be directed toward the colored region (e.g., using light source 120) and the portion of the blue light reflected from the colored region may be measured (e.g., using sensor 130). Thus, a color of the colored region may be determined based upon the relative intensities of each measured color channel (e.g., red, green and blue).

The number of colors and/or shades of color capable of detection by device 100 may be determined by a number of bits of information allocated to each color channel. For example, using a color system with three color channels (e.g., RGB), if a single bit of information is allocated to each color channel, then only seven colors may be distinguished. If two bits of information are allocated to each color channel in a three color channel system, then 63 colors may be distinguished. Further, if three bits are allocated to each color channel in a three color channel system, then 511 colors may be distinguished.

Alternatively, when using a multi-channel color system, light source 120 may emit a composite-colored (e.g., white) light comprising multiple colors of different wavelengths. The composite-colored light may then be filtered either before (e.g., with optical component 140a) or after (e.g., with optical component 140b) reflection off the colored region to account for each color channel of the respective color system (e.g., red, green or blue if using an RGB color system, etc.). For example, a filter leaving mostly red light may be applied (e.g., as optical component 140a and/or 140b) such that sensor 130 measures a red portion of the composite-colored light reflected from the colored region. Thereafter, a filter leaving mostly light corresponding to each of the remaining color channels (e.g., green and blue) may be applied to light emitted and/or received by device 100. As such, sensor 130 may measure the relative intensities of the different light channels to determine the color of the colored region.

Once the color of a colored region is determined, the position of the colored region (e.g., on a color-coded medium) and/or an object (e.g., comprising the colored region) may be determined. For example, color-coded information may be stored in either memory 150 or external memory 165, where memory 150 is coupled to processor 110 and external memory 165 is removably coupled with processor 110 via external memory interface 160. Color-coded information may comprise a lookup table which may be indexed using a determined color to retrieve a position and/or object identification. Alternatively, color-coded information may comprise equations which relate color to at least one of position and object identification. As such, processor 110 may access color-coded information using the determined color of a colored region to retrieve a position and/or object identification associated with the colored region.

As shown in FIG. 1, device 100 may comprise one or more output interface and/or components for interacting with users, systems, devices or the like. For example, visual output component 170 may comprise a display, lights or the like, where component 170 delivers visual output. Audible output component 180 may comprise a speaker, vibrator or the like, where component 180 delivers audible output. Additionally, device 100 may comprise auxiliary output interface 190 for delivering auxiliary output. In one embodiment, interface 190 may couple device 100 to an external system, device, component, etc., where the auxiliary output may comprise color information (e.g., indicating a determined color of a colored region), position information (e.g., of a colored region with respect to other colored regions, objects, etc.), object identification (e.g., where the object comprises the colored region, is associated with the colored region, etc.), etc.

In one embodiment, output from device 100 (e.g., visual, audible, etc.) may be rendered (e.g., by component 170, 180, 190, etc.) in accordance with specific content. The specific content may be stored within a memory (e.g., 140) of device 100. Additionally, the content may be associated with a measured color of a surface, a determined position of device 100, an object identified by device 100, etc.

Optical component 140a and/or 140b may comprise a lens for focusing light directed from and/or to device 100. Where optical component 140a comprises a lens, light output from device 100 may be focused to adjust for colored regions of different sizes, different operating distances between device 100 and a colored region, etc. As such, component 140a may vary the ability of device 100 to detect variations in color on a surface by changing the area of illumination and/or the intensity of the illumination of the light output from the device, thereby adjusting the accuracy and/or sensitivity of device 100. Additionally, where optical component 140b comprises a lens, reflected light input to device 100 may be focused to adjust the accuracy and/or sensitivity of sensor 130.

Additionally, optical components 140a and/or 140b may be used to alternatively manipulate light output from or input to device 100. For example, components 140a and/or 140b may be used to diffuse, channel and/or offset light. Alternatively, components 140a and/or 140b may polarize light (e.g., to reduce the magnitude of specular reflections compared with diffuse reflection). And in another embodiment, device 100 may use components 140a and/or 140b to perform color separation (e.g., similar to a prism), where select colors separated from a composite-colored light may then be individually reflected off the colored region and/or fed to sensor 130 for measurement thereof and determination of the color of the colored region.

As shown in FIG. 1, light source 120 may comprise a light-emitting diode (LED), light bulb (e.g., incandescent, fluorescent, etc.) or other component capable of generating light. Light source 120 may be a multi-colored light source capable of separately emitting individual colors (e.g., red, green, blue, etc.), where the color being emitted may be changed by placing light source 120 in a different state (e.g., by changing a current path through the light source, by activating a switch, etc.). Alternatively, light source 120 may be a single-color (e.g., white) light source capable of emitting composite-colored light, where the composite-colored light may comprise multiple colors which may be filtered and/or separated out as discussed above.

Alternatively, light source 120 may emit light outside the visible spectrum (e.g., infrared (IR) light, etc.) for use in normalizing the color measurements taken by device 100. The IR light, or other light outside the visible spectrum, may be emitted by light source 120 in addition to the emission of individual and/or composite-colored light (e.g., when in a separate state, emitted simultaneously and filtered/separated, etc.). And alternatively, separate light sources may be used to emit the light used for color measurement (e.g., red, green, blue, etc.) and the reference channel light (e.g., IR). The IR light may be directed onto the colored region (e.g., using IR transparent inks) and the intensity of the reflected portion may be measured to generate a reference measurement signal. The reference measurement signal may then be applied (e.g., as discussed below with respect to FIG. 13) to each of the color measurement signals (e.g., red, green, blue, etc.) for normalization thereof (e.g., to account for variations in angle and/or distance of device 100 with respect to the colored region, etc.).

In addition to normalization of color measurements, device 100 may perform ambient light measurements to account for changes in ambient lighting conditions. When performing ambient light measurements, device 100 may activate sensor 130 while not emitting any light from light source 120. As such, ambient light reflected from the colored surface may be sensed and used to generate an ambient light measurement signal in response thereto. The ambient light measurement signal may then be applied to each of the color measurement signals to adjust or calibrate for current ambient light conditions, thereby improving color detection capabilities of device 100.

Additionally, device 100 may be calibrated to enhance precision and/or accuracy of the color measurements. In one embodiment, device 100 may be calibrated by determining the color of a reference patch (e.g., an area for which the color is known). As such, corrections may be made to one or more of the color measurement channels (e.g., by applying a respective correction factor). In another embodiment, multiple reference patches may be used. And in yet another embodiment, calibration may be performed at the factory (e.g., before use by an end-user) to account for variations among light sources, sensors, etc.

Although FIG. 1 shows interface device 100 with a specific number of light sources, sensors and optical components, it should be appreciated that a larger or smaller number may be used in other embodiments. Additionally, although FIG. 1 shows device 100 with a specific number of memory components and/or interfaces, it should be appreciated that a larger or smaller number may be used in other embodiments. Further, although FIG. 1 depicts device 100 with specific output components (e.g., 170 and 180) and interfaces (e.g., 190), it should be appreciated that a larger or smaller number may be used in other embodiments, where additional interfaces and/or components not depicted in FIG. 1 may be used in addition to and/or in place of those depicted in FIG. 1.

Figure 2:
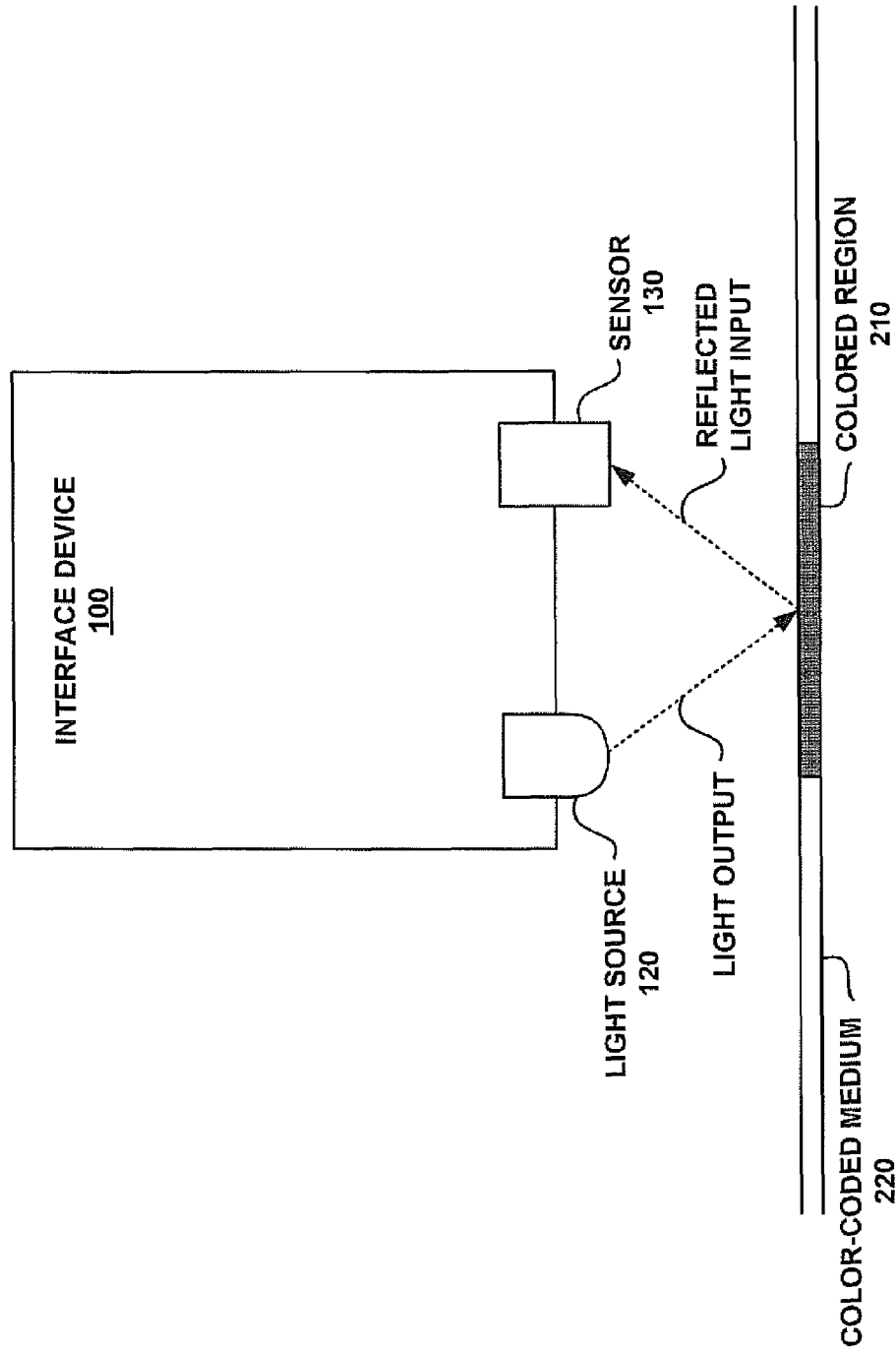
FIG. 2 shows an exemplary interface device in proximity to a colored region in accordance with one embodiment of the present invention.

FIG. 2 shows exemplary interface device 100 in proximity to a colored region in accordance with one embodiment of the present invention. As shown in FIG. 2, light source 120 and sensor 130 may be positioned with respect to device 100 such that the color of colored region 210 may be detected when device 100 is brought in proximity to region 210. It should be appreciated that the term "proximity" may relate to a distance between device 100 and region 210 such that device 100 is able determine the color of region 210. Color detection may be performed by sensing (e.g., with sensor 130) a reflected portion of light output from light source 120 and reflected off region 210, where the directed light may comprise one or more colors (e.g., red, green, blue, etc.) and/or a reference channel color (e.g., IR), as discussed above with respect to FIG. 1.

Colored region 210, depicted in FIG. 2 as a portion of color-coded medium 220, may comprise one or more colors (e.g., solid color, shades of a solid color, white, black, grayscale, etc.). Medium 220 may be flat, spherical, or alternatively shaped/contoured. In one embodiment, sensor 130 may sense an average color of all colors within an area illuminated by light from light source 120 and/or sensed by sensor 130. When an average color is sensed, it should be appreciated that the relative intensities of the color channels sensed by sensor 130 may vary depending upon the relative surface area covered by each respective color. For example, if an area illuminated by light source 120 and/or sensed by sensor 130 is comprised of 20 percent green and 80 percent red, then the intensity of red light reflected from region 210 may exceed that of reflected green light (e.g., using an RGB color system).

Region 210 may comprise contiguous color, patterned color (e.g., dots, squares, lines, etc. of one or more colors), or other color-coded implementations. As such, device 100 provides flexibility with respect to the medium upon which color determination may be performed. For example, colored region 210 may comprise commercial printing (e.g., by a commercial printer, laser printer, ink jet printer, dot-matrix printer, etc.) on most any surface (e.g., depicted in FIG. 2 as color-coded medium 220). Alternatively, region 210 may comprise painting or handwriting on most any medium (e.g., depicted in FIG. 2 as color-coded medium 220). And in another embodiment, region 210 may comprise a displayed image on a display device (e.g., comprising medium 220) coupled to a computer system (e.g., also coupled to and receiving input from device 100, etc.), media input (e.g., cable, satellite, internet, etc.), etc.

It should be appreciated that light source 120 and/or sensor 130 may be implemented using one or more respective components. Alternatively, a single component performing both light directing and sensing functions may be used. Further, it should be appreciated that the size of colored region 210, the size of device 100, the size of the components of device 100 (e.g., 120, 130, etc.), and the position of those components (e.g., space between the components, etc.) is merely exemplary and may be varied in other embodiments.

Figure 3:
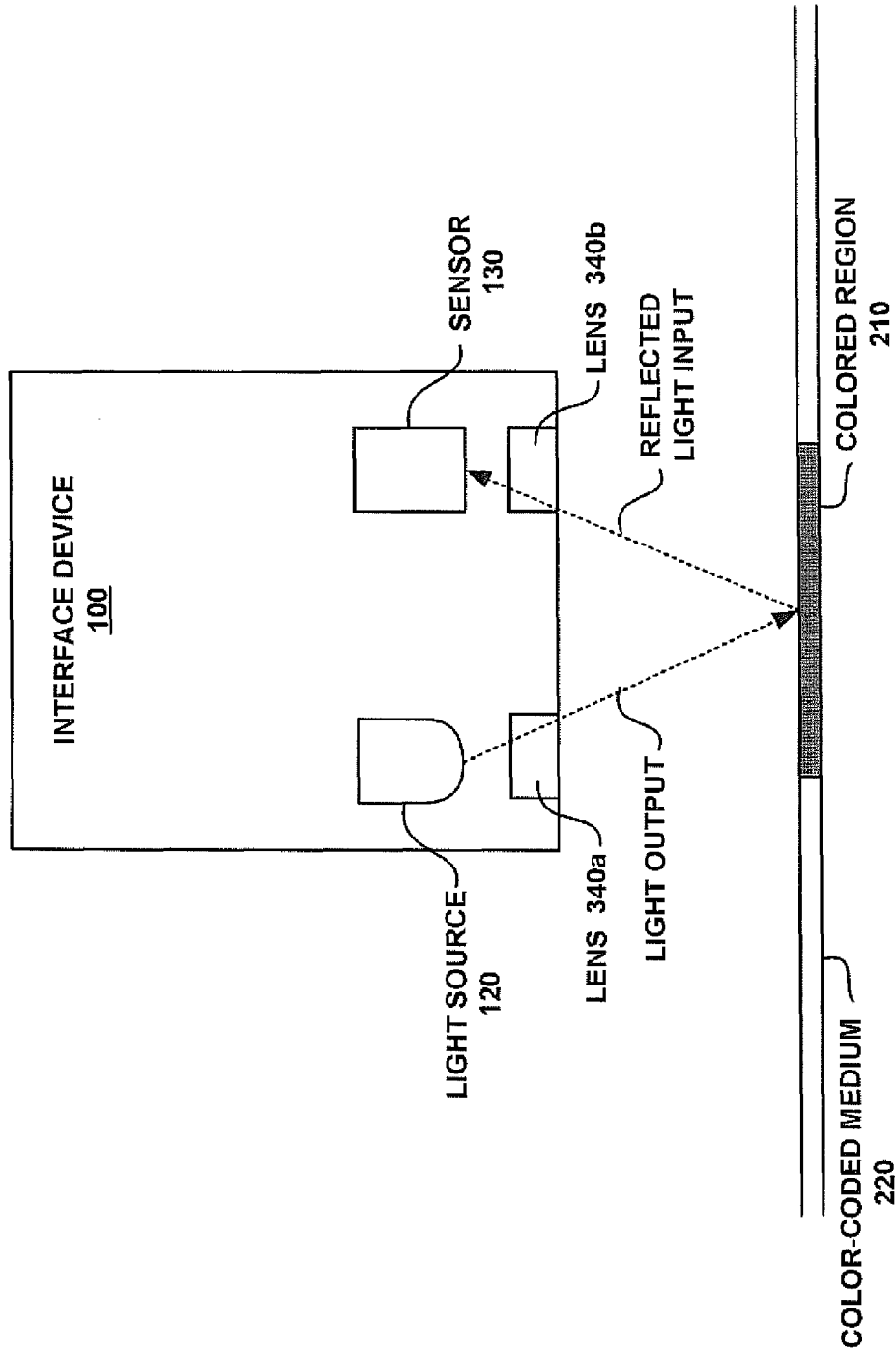
FIG. 3 shows an exemplary interface device in proximity to a colored region using at least one lens in accordance with one embodiment of the present invention.

FIG. 3 shows exemplary interface device 100 in proximity to a colored region using at least one lens in accordance with one embodiment of the present invention. As shown in FIG. 3, a lens may be placed in the path of the directed light (e.g. lens 340a) and/or the reflected light (e.g., lens 340b) to focus the light directed to and/or emitted from device 100, thereby adjusting the accuracy and/or sensitivity of device 100.

Lens 340a may be placed between colored region 210 and light source 120 to focus the light emitted from light source 120. As such, the area illuminated by light source 120, as well as the intensity of the illuminated area, may be adjusted by lens 340a. In one embodiment, a smaller illuminated area projected on colored region 210 may result in increased accuracy and/or sensitivity given a reduction in color averaging (e.g., where region 210 comprises more than one color). Alternatively, where the intensity of the illuminated area is increased, the accuracy of device 100 may increase (e.g., through resolution error reduction, etc.) given the additional reflection light reaching sensor 130.

Lens 340b may be placed between colored region 210 and sensor 130 to focus the light reflected to sensor 130. Similar to the use of a corrective lens in front of a human eye, lens 340b may adjust the ability of sensor 130 to detect variations in color. Additionally, lens 340b may adjust the field of vision of sensor 130, thereby adjusting the amount of color averaging performed by device 100 by varying the area of region 210 considered during a color determination. For example, in one embodiment, a reduction in the area of region 210 considered during a color determination can increase the accuracy and/or sensitivity of device 100 by reducing the amount of color averaging. As such, lens 340b may adjust the accuracy and/or sensitivity of device 100.

Although only two lenses (e.g., 340a and 340b) are depicted in FIG. 3, it should be appreciated that a larger or smaller number of lenses may be used in other embodiments (e.g., where additional light sources and/or sensors are used, etc.). Additionally, although only one lens is allocated to outgoing light from device 100 and only one lens is allocated to incoming light to device 100, it should be appreciated that a larger or smaller number of lenses may be used for each respective light path in other embodiments. Further, it should be appreciated that device 100 may comprise other optical components (e.g., to diffuse light, channel light, offset light, separate colors of light, polarize light, etc.) in addition to and/or in place of the lenses depicted in FIG. 3.

Figure 4:
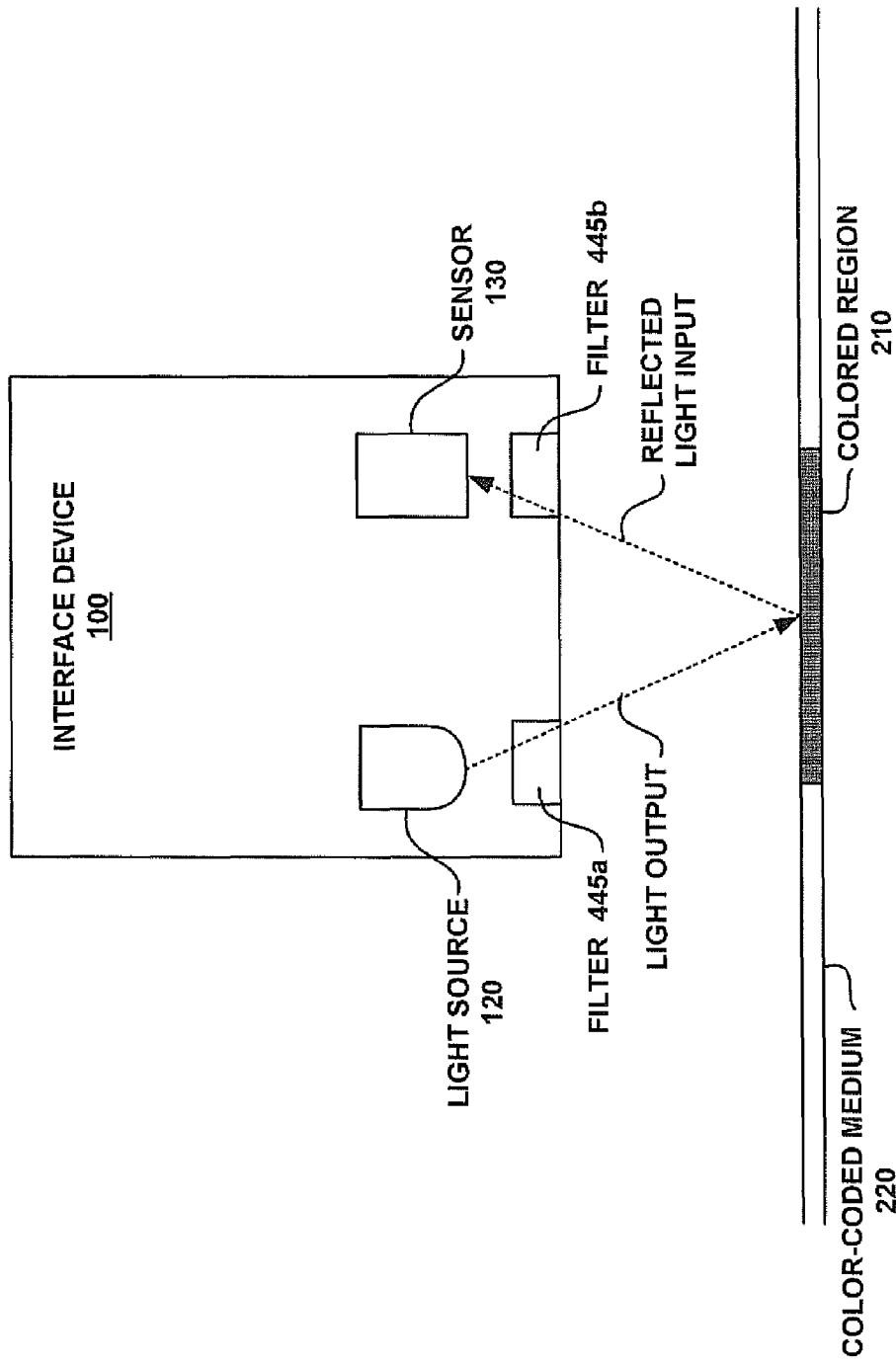
FIG. 4 shows an exemplary interface device in proximity to a colored region using at least one filter in accordance with one embodiment of the present invention.

FIG. 4 shows exemplary interface device 400 in proximity to a colored region using at least one filter in accordance with one embodiment of the present invention. As shown in FIG. 4, a filter may be placed in the path of the directed light (e.g. filter 445a) and/or the reflected light (e.g., filter 445b) to filter the light directed to and/or emitted from device 100, thereby enabling light source 120 to emit composite-colored light for use in determining the color of region 210. For example, filter 445a may filter light of a desired color from composite-colored (e.g., white, etc.) light emitted by light source 120, thereby reflecting light of the desired color off region 210 for measurement by sensor 130. Filter 445a may then change state such that different colors are reflected off region 210 and measured by sensor 130 (e.g., when using a multi-channel color system). As such, device 100 may compare relative intensities of the different color channels to determine the color of region 210.

Alternatively, composite-colored light may be emitted from light source 120 and reflected off colored region 210. Filter 445b may then be used to filter out light of a desired color for measurement by sensor 130, where filter 445a may change state to enable measurement of various colors of light similar to filter 445a (e.g., when using a multi-channel color system).

And in another embodiment, both filter 445a and 445b may be used. Filter 445a may perform initial filtering of the composite-colored light before reflection off region 210. After the filtered light is reflected off region 210, filter 445b may then perform additional filtering of the light before measurement by sensor 130. Additionally, the state of filter 445a and/or 445b may be changed to alter filtering abilities of the respective filters as discussed above.

Although only two filters (e.g., 445a and 445b) are depicted in FIG. 4, it should be appreciated that a larger or smaller number of filters may be used in other embodiments (e.g., where additional light sources and/or sensors are used, etc.). Additionally, although only one filter is allocated to outgoing light from device 100 and only one filter is allocated to incoming light to device 100, it should be appreciated that a larger or smaller number of filters may be used for each respective light path in other embodiments. Further, it should be appreciated that device 100 may comprise other optical components (e.g., to diffuse light, channel light, offset light and/or separate colors of light) in addition to and/or in place of the filters depicted in FIG. 4.

Figure 5:
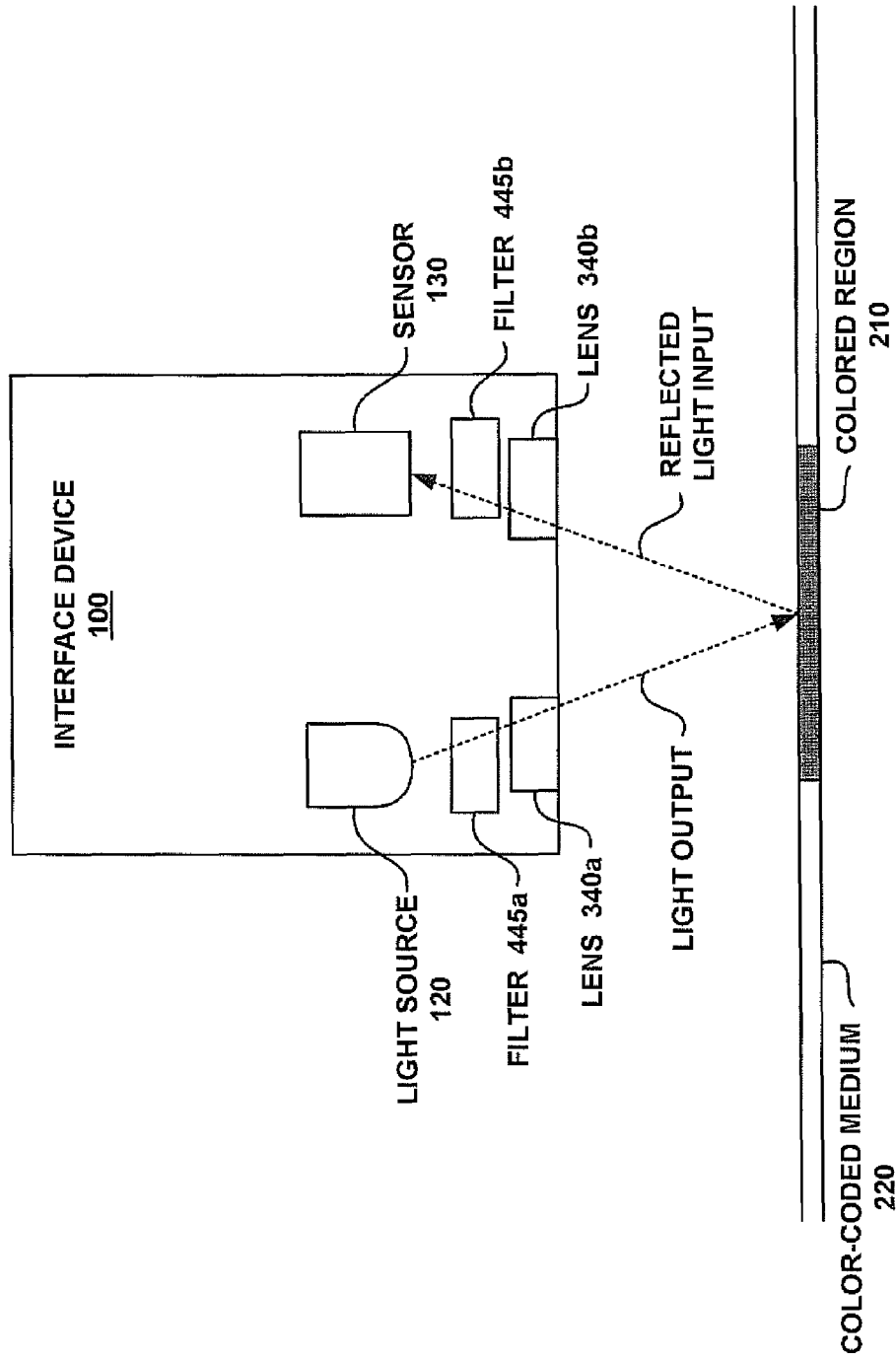
FIG. 5 shows an exemplary interface device in proximity to a colored region using at least one lens and at least one filter in accordance with one embodiment of the present invention.

FIG. 5 shows exemplary interface device 100 in proximity to a colored region using at least one lens and at least one filter in accordance with one embodiment of the present invention. As shown in FIG. 5, a lens/filter combination may be placed in the path of the directed light (e.g. lens 340a and filter 445a) and/or the reflected light (e.g., lens 340b and filter 445b) to filter and focus the light directed to and/or emitted from device 100. As such, device 100 can adjust color detection accuracy and/or sensitivity using lens 340a and/or 340b as discussed above with respect to FIG. 3 while using a light source (e.g., 120) capable of emitting composite-colored light as discussed above with respect to FIG. 4.

Although only two lenses (e.g., 340a and 340b) and two filters (e.g., 445a and 445b) are depicted in FIG. 4, it should be appreciated that a larger or smaller number of filters may be used in other embodiments (e.g., where additional light sources and/or sensors are used, etc.). Additionally, although only one lens and one filter is allocated to outgoing light from device 100 and only one filter is allocated to incoming light to device 100, it should be appreciated that a larger or smaller number of lenses and/or filters may be used for each respective light path in other embodiments. Further, it should be appreciated that device 100 may comprise other optical components (e.g., to diffuse light, channel light, offset light, separate colors of light, polarize light, etc.) in addition to and/or in place of the lenses and/or filters depicted in FIG. 5.

Figure 6:
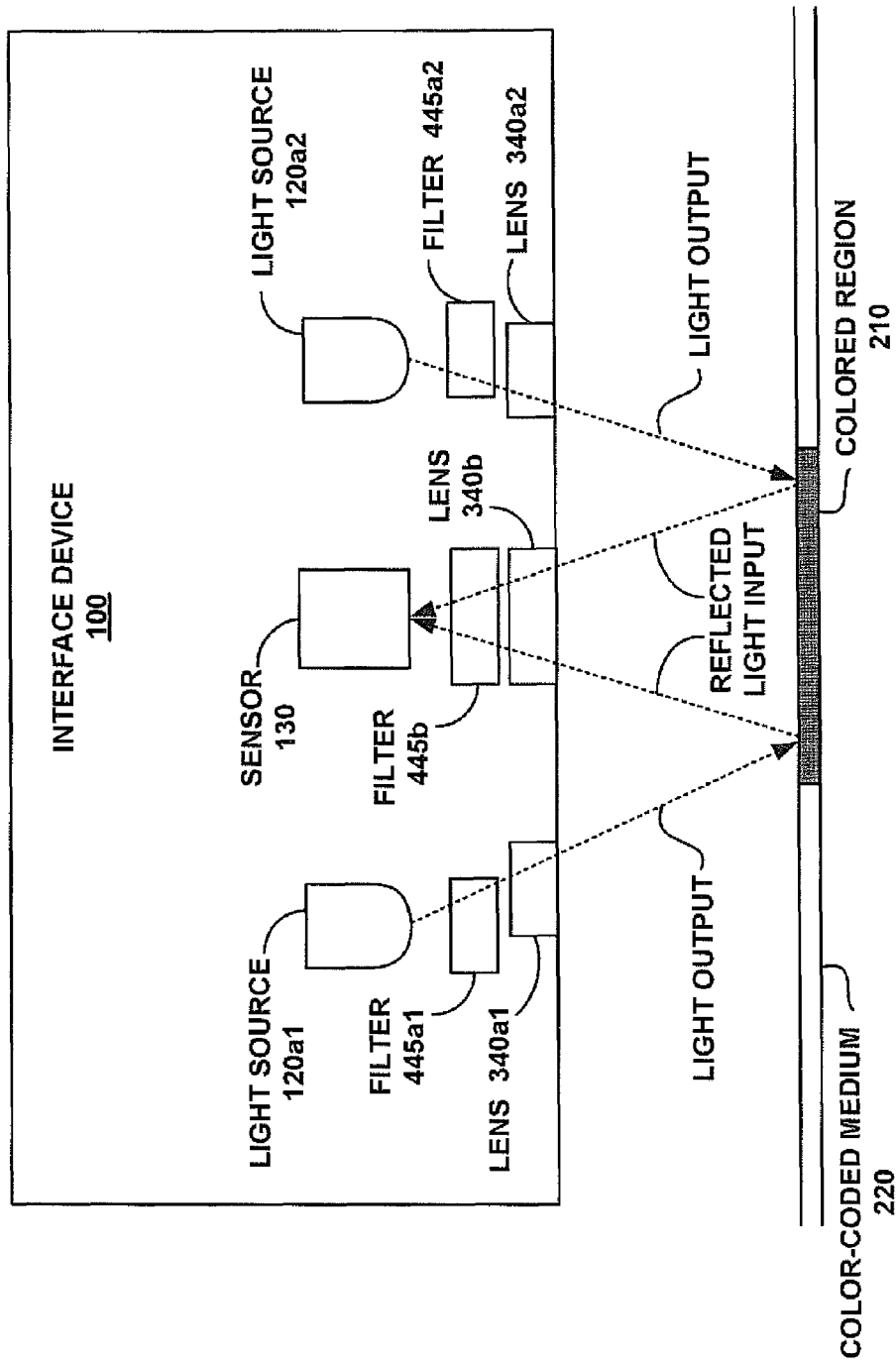
FIG. 6 shows an exemplary interface device in proximity to a colored region using multiple light sources in accordance with one embodiment of the present invention.

FIG. 6 shows exemplary interface device 100 in proximity to a colored region using multiple light sources in accordance with one embodiment of the present invention. As shown in FIG. 6, device 100 comprises multiple light sources (e.g. 120a1 and 120a2) for reflecting light of different colors off region 210 for measurement by sensor 130. In one embodiment, light source 120a1 may be allocated to a first color channel and light source 120a2 may be allocated to a second color channel. As such, device 100 may activate the respective light sources to perform color channel measurements and determine the color of colored region 210. Alternatively, light source 120a1 and/or 120a2 may be allocated to a reference channel (e.g., for emitting IR light) such that reference light measurements can be taken by device 100 to normalize the color measurements taken by device 100.

Light sources 120a1 and 120a2 may be positioned equidistant from sensor 130 such that the angle of reflection off of region 210 is similar for all color and/or reference channels. Alternatively, the distance between sensor 130 and each light source may vary.

Although FIG. 6 depicts only two light sources (e.g., 120a1 and 120a2), it should be appreciated that more than two light sources may be used in other embodiments. For example, when using an RGB color measurement system with normalization capabilities, four light sources may be used (e.g., one for each color channel and one for the reference channel).

As shown in FIG. 6, a lens and filter may be placed in the path of the directed light (e.g., lens 340a1, lens 340a2, filter 445a1 and filter 445a2) and the reflected light (e.g., lens 340b and filter 445b) to focus and filter the light as discussed above with respect to FIGS. 3, 4 and 5. Alternatively, a lens and/or filter may be omitted from any number of light inlets and/or outlets of device 100. And in other embodiments, a larger number of lenses and/or filters may be used at any number of light inlets and/or outlets of device 100. Further, it should be appreciated that device 100 may comprise other optical components (e.g., to diffuse light, channel light, offset light and/or separate colors of light) in addition to and/or in place of the lenses and/or filters depicted in FIG. 6.

Figure 7:
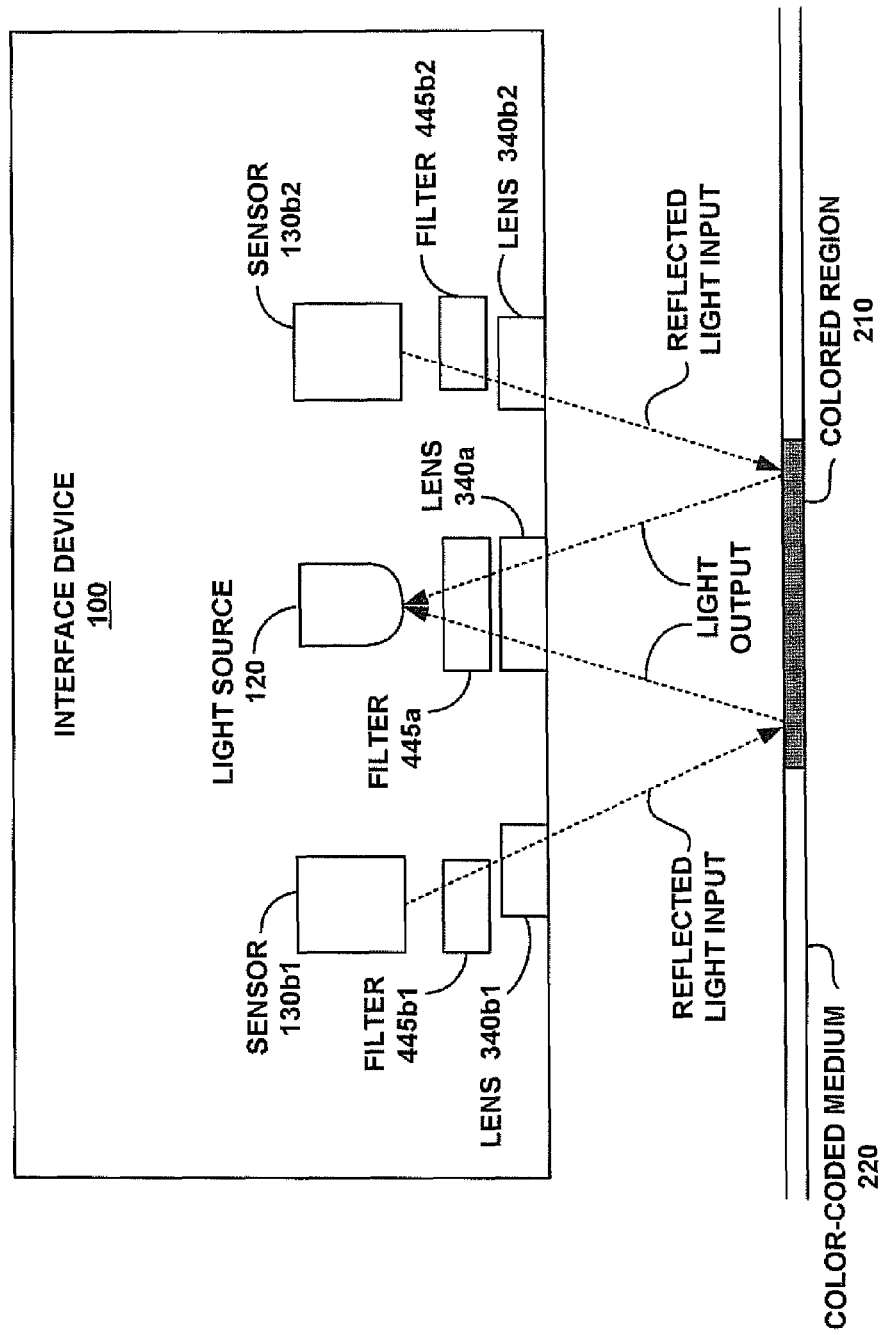
FIG. 7 shows an exemplary interface device in proximity to a colored region using multiple sensors in accordance with one embodiment of the present invention.

FIG. 7 shows exemplary interface device 100 in proximity to a colored region using multiple sensors in accordance with one embodiment of the present invention. As shown in FIG. 7, device 100 comprises light source 120 for reflecting light of different colors off region 210 for measurement by multiple sensors (e.g., 130b1 and 130b2). In one embodiment, sensor 130b1 may be allocated to a first color channel and sensor 130b2 may be allocated to a second color channel. As such, device 100 may sense reflected light from light source 120 to perform color channel measurements and determine the color of colored region 210. Alternatively, sensor 130b1 and/or 130b2 may be allocated to a reference channel (e.g., for sensing IR light) such that reference light measurements can be taken by device 100 to normalize the color measurements taken by device 100.

Sensors 130b1 and 130b2 may be positioned equidistant from light source 120 such that the angle of reflection off of region 210 is similar for all color and/or reference channels. Alternatively, the distance between light source 120 and each sensor may vary.

Although FIG. 7 depicts only two sensors (e.g., 130b1 and 130b2), it should be appreciated that more than two sensors may be used in other embodiments. For example, when using an RGB color measurement system with normalization capabilities, four sensors may be used (e.g., one for each color channel and one for the reference channel).

As shown in FIG. 7, a lens and filter may be placed in the path of the directed light (e.g., lens 340b1, lens 340b2, filter 445b1 and filter 445b2) and the reflected light (e.g., lens 340a and filter 445a) to focus and filter the light as discussed above with respect to FIGS. 3, 4, 5 and 6. Alternatively, a lens and/or filter may be omitted from any number of light inlets and/or outlets of device 100. And in other embodiments, a larger number of lenses and/or filters may be used at any number of light inlets and/or outlets of device 100. Further, it should be appreciated that device 100 may comprise other optical components (e.g., to diffuse light, channel light, offset light and/or separate colors of light) in addition to and/or in place of the lenses and/or filters depicted in FIG. 7.

Figure 8:
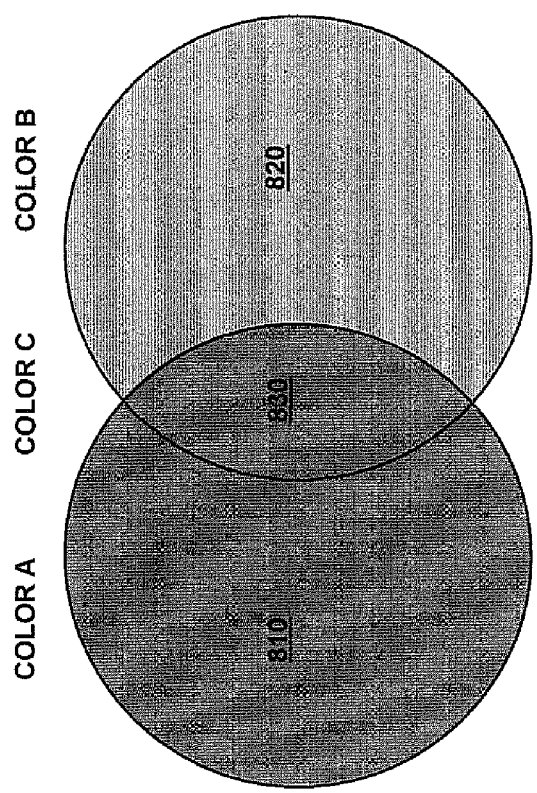
FIG. 8 shows an exemplary contiguous color arrangement for recognition by an exemplary interface device in accordance with one embodiment of the present invention.

FIG. 8 shows exemplary contiguous color arrangement 800 for recognition by an exemplary interface device in accordance with one embodiment of the present invention. As shown in FIG. 8, color A represented by section 810 and color B represented by section 820 may be mixed to form color C represented by section 830. As such, device 100 may recognize both contiguous solid colors (e.g., A and B) and contiguous mixed colors (e.g., C) provided device 100 is brought into proximity with a surface (e.g., 220 of FIGS. 2-7) upon which the colors are disposed (e.g., represented by colored region 210 of FIGS. 2-7). In one embodiment, device 100 may recognize one or more colors depicted in FIG. 8 provided the colors are within an area both illuminated by a light source (e.g., 120 of FIG. 1) of device 100 and in the field of vision of a sensor (e.g., 130) of device 100.

Figure 9:
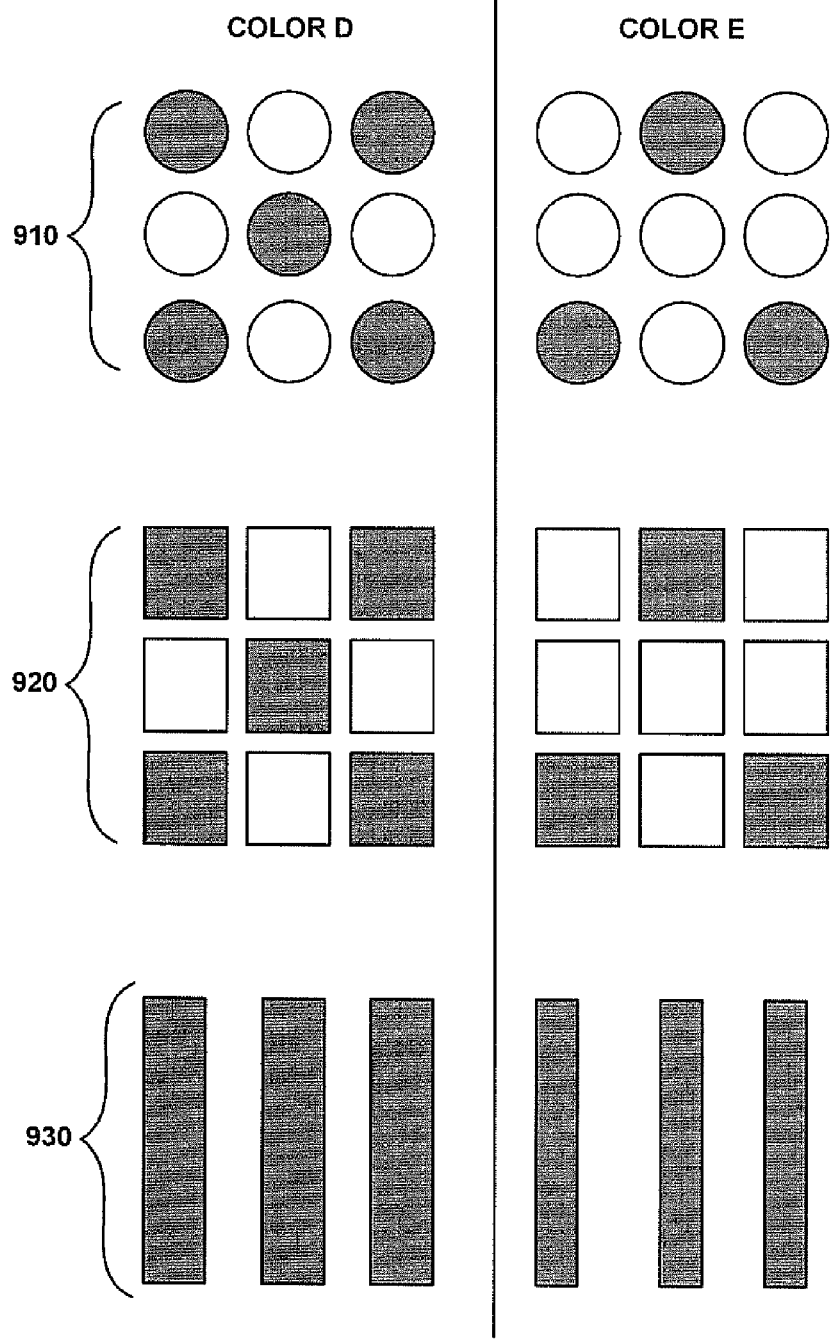
FIG. 9 shows exemplary color patterns for recognition by an exemplary interface device in accordance with one embodiment of the present invention.

FIG. 9 shows exemplary color patterns 900 for recognition by an exemplary interface device in accordance with one embodiment of the present invention. As shown in FIG. 9, patterns 900 comprise dot patterns 910, square patterns 920 and line patterns 930, where each of the pattern groups (e.g., 910, 920 and 930) represent a color D and color E. Color D may represent a darker color (or shade of the color) than color E given that the color D patterns comprise more dark area than the color E patterns. As such, the color of a colored region (e.g. 210 of FIGS. 2-7), or a shade thereof, may be varied by applying patterns with different color arrangements of elements (e.g., dots, squares, lines, etc.).

Device 100 can recognize patterns 910-930 (or a portion thereof) by directing different channels of light onto the patterns and measuring the relative intensities of the reflected portions of the light, thereby carrying out color averaging as discussed above. For example, if the dark elements of color D in FIG. 9 represent the color blue and the light elements of color D represent the color yellow, device 100 may determine that color D is green.

Although the patterns depicted in FIG. 9 show elements of only two colors, it should be appreciated that any number of colors may be used. Additionally, although only three color patterns (e.g., 910-930) are shown, it should be appreciated that other patterns may be recognized by device 100 (e.g., using color averaging, etc.). Further, as discussed above, it should be appreciated that the word "color" should be interpreted to comprise common colors (e.g., red, yellow, etc.) as well as white, black and grayscale.

Figure 10:
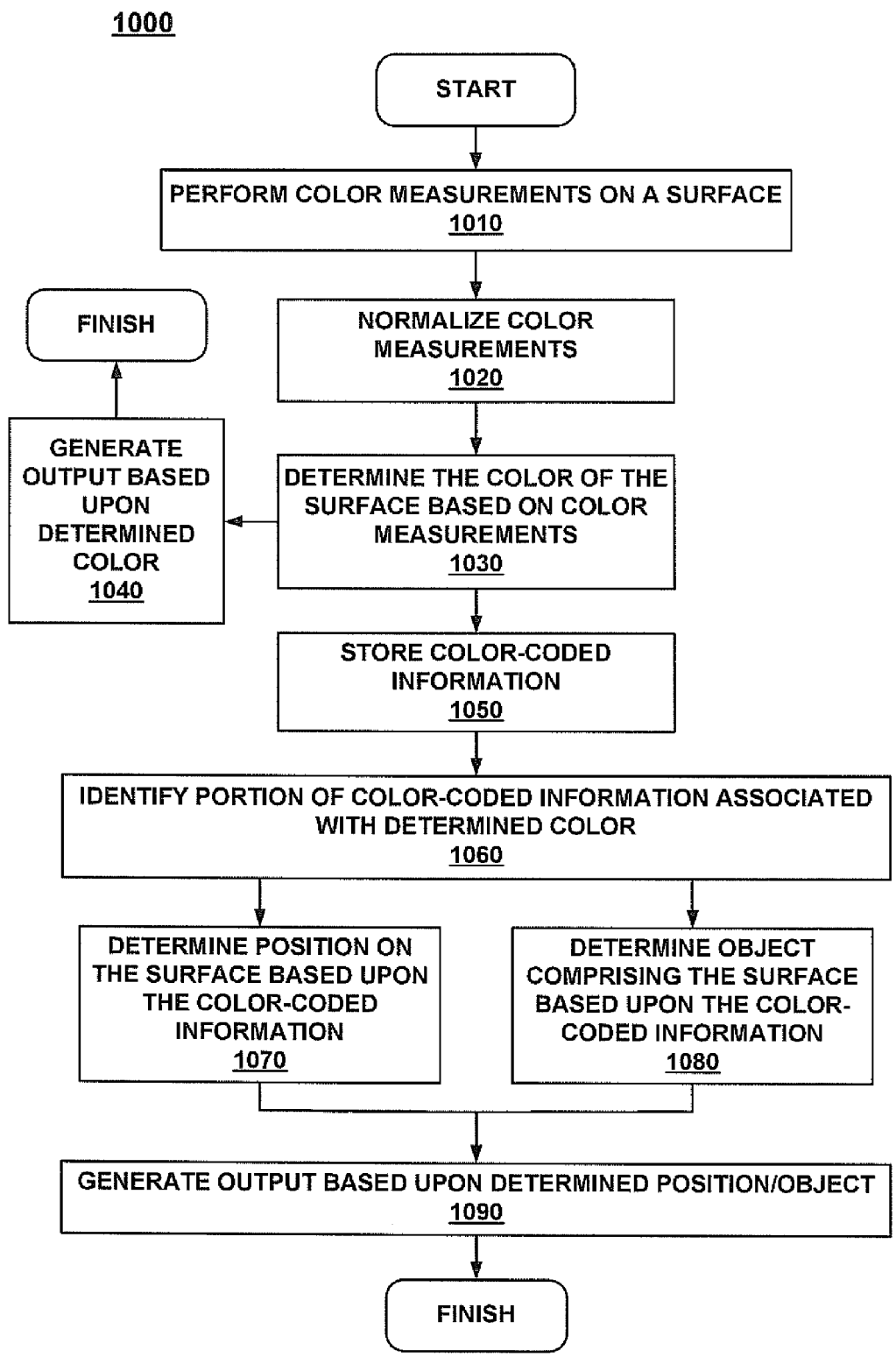
FIG. 10 shows an exemplary process for determining at least one of a position on a surface or an object comprising the surface in accordance with one embodiment of the present invention.

FIG. 10 shows exemplary process 1000 for determining at least one of a position on a surface or an object comprising the surface in accordance with one embodiment of the present invention. As shown in FIG. 10, step 1010 involves performing color measurements on a surface. The surface may be a color-coded medium (e.g., 220 of FIGS. 2-7) with at least one colored region (e.g., 210 of FIGS. 2-7), where the surface may be flat, spherical, or alternatively shaped/contoured. The color measurements may be performed by a peripheral interface device (e.g., 100) brought in proximity to the surface. Additionally the color measurements may involve measuring (e.g., with sensor 130) the relative intensity of reflected portions of different colors of light reflected off the colored region (e.g., producing respective color measurement signals), where the different colors are produced by a light source (e.g., 120). The light source may emit light of a single color, light of multiple colors (e.g., each color switched on separately), composite-colored light from which light of individual colors may be separated (e.g., using a filter, prism, etc.), etc.

Step 1020 involves normalizing the color measurements. Light of a reference channel may be reflected onto the colored region such that the reflected portion of the reference channel light may then be measured. The reference channel measurement may then be applied to each color channel measurement for normalization thereof. The reference channel light may be IR light, colored light, etc. Alternatively, at least one of the color channels may additionally be used as the reference channel.

As shown in FIG. 10, step 1030 involves determining the color of the surface based on the color measurements. The color may be determined based upon the relative measurements of each color channel. For example, where 24-bit RGB color model is used, color channel measurements of red=255, green=255 and blue=0 may indicate that the colored region is yellow. In this case, the colored region may comprise yellow coloring (e.g., contiguous, patterned, etc.), or alternatively a combination of colors producing an average yellow color (e.g., red and green dots, squares, lines or other pattern elements). Additionally, the color may be determined by a processor (e.g., 110) in response to accessing color measurement signals of the respective color channels.

Step 1040 involves generating output based upon the color of the surface determined in step 1030. The output may be generated by at least one of a visual output component (e.g., 170), an audible output component (e.g., 180), and an auxiliary output component (e.g., 190). The output may be in response to receipt of an output signal (e.g., from by processor 110, a signal processing component coupled to the output component/device, etc.). Additionally, the output may comprise interaction with a user, an external system, external device, etc.

Alternatively, if step 1050 is performed instead of step 1040, color-coded information may be stored in step 1050. The color-coded information may comprise a lookup table which may be indexed using a determined color to retrieve a position and/or object identification. Alternatively, the color-coded information may comprise equations which relate color to at least one of position and object identification. Additionally, the color-coded information may be stored in a memory (e.g., 150) of an interface device (e.g., 100) performing the color measurements in step 1010. Alternatively, the color-coded information may be stored in an external memory (e.g., 165) accessible by an interface device (e.g., 100) performing the color measurements in step 1010.

As shown in FIG. 10, step 1060 involves identifying a portion of the color-coded information associated with the determined color. The identification may be performed using the color of the surface as determined in step 1030.

After identifying a portion of the color-coded information associated with the determined color, step 1070 and/or step 1080 may be performed before concluding process 1000. Step 1070 involves determining a position on the surface based upon the identified color-coded information. The identified color-coded information may provide a relative position (e.g., with respect to other colored regions on the surface, with respect to other surfaces and/or objects, etc.), absolute position, etc. of a colored region on the surface. In one embodiment, the color-coded information may comprise an index of determined colors with respective positions (e.g., relative, absolute, etc.) of regions comprising each determined color.

Step 1080 involves determining an object comprising the surface based upon the identified color-coded information. The identified color-coded information may provide an object identification, where the object comprises a colored region of the surface. The color-coded information may also provide additional information related to the object. For example, where the object is a cube with different colored sides, a color determination of a select side of the cube may enable a determination that the colored region resides on the select side. As such, the color-coded information may provide both object identification and object characteristic identification. In one embodiment, the color-coded information may comprise an index of determined colors with respective object and/or object characteristics associated with each determined color.

As shown in FIG. 10, step 1090 involves generating output based upon the position determined in step 1070 and/or the object determined in step 1080. The output may be generated by at least one of a visual output component (e.g., 170), an audible output component (e.g., 180), and an auxiliary output component (e.g., 190). The output may be in response to receipt of an output signal (e.g., from by processor 110, a signal processing component coupled to the output component/device, etc.). Additionally, the output may comprise interaction with a user, an external system, external device, etc.

Figure 11:
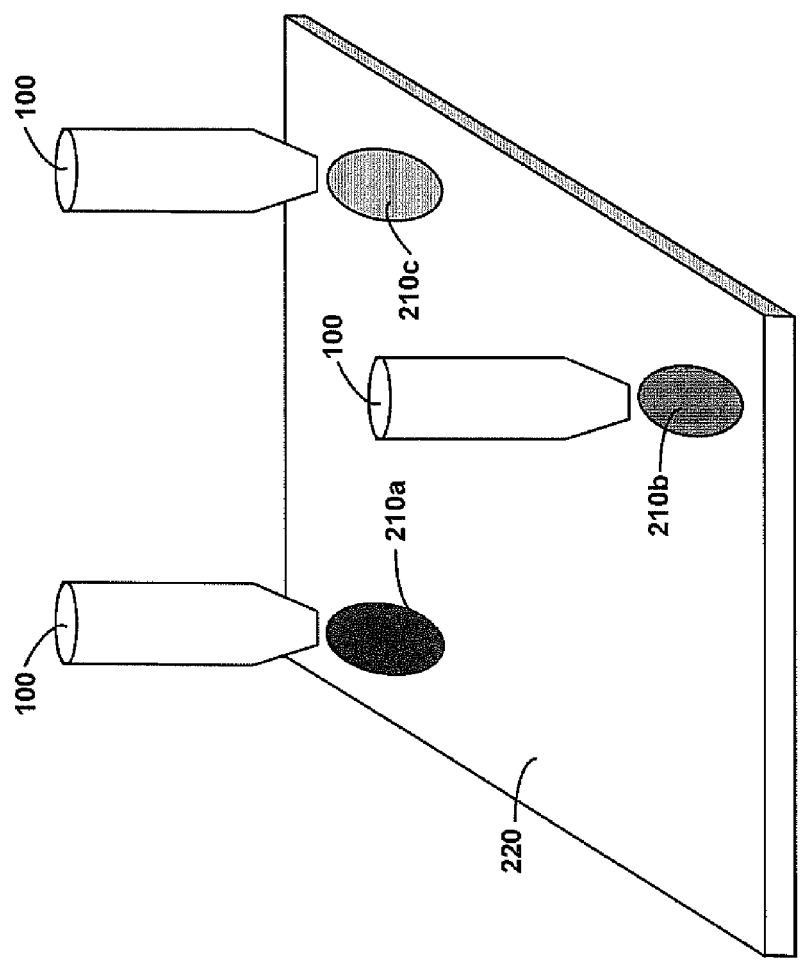
FIG. 11 shows an exemplary object with colored regions for recognition by an exemplary interface device in accordance with one embodiment of the present invention.

FIG. 11 shows exemplary object 1100 with colored regions for recognition by an exemplary interface device in accordance with one embodiment of the present invention. As shown in FIG. 11, object 1100 comprises color-coded medium 220 with multiple colored regions (e.g., 210a, 210b and 210c). Each colored region may represent a different color and have a different position on medium 220 as depicted in FIG. 11. As such, when device 100 is brought into proximity of (e.g., placed over) a given colored region (e.g., 210a, 210b or 210c), the color of the region may be determined (e.g., as discussed above with respect to the prior figures). The determined color may then be used to determine the position of the region on medium 220 (e.g., by accessing color-coded information comprising position information associated with the determined color).

Although FIG. 11 shows only three colored regions, it should be appreciated that a larger or smaller number of colored regions may be placed on a given surface (e.g., 220) in other embodiments. Further, it should be appreciated that the colored regions (e.g., for which color-coded information is available) may be placed on different surfaces (e.g., different pages of a book, different display screens, etc.) in other embodiments. And in another embodiment, the colored regions may be placed on surfaces with different shapes and/or contours (e.g., spherical, etc.).

Figure 12:
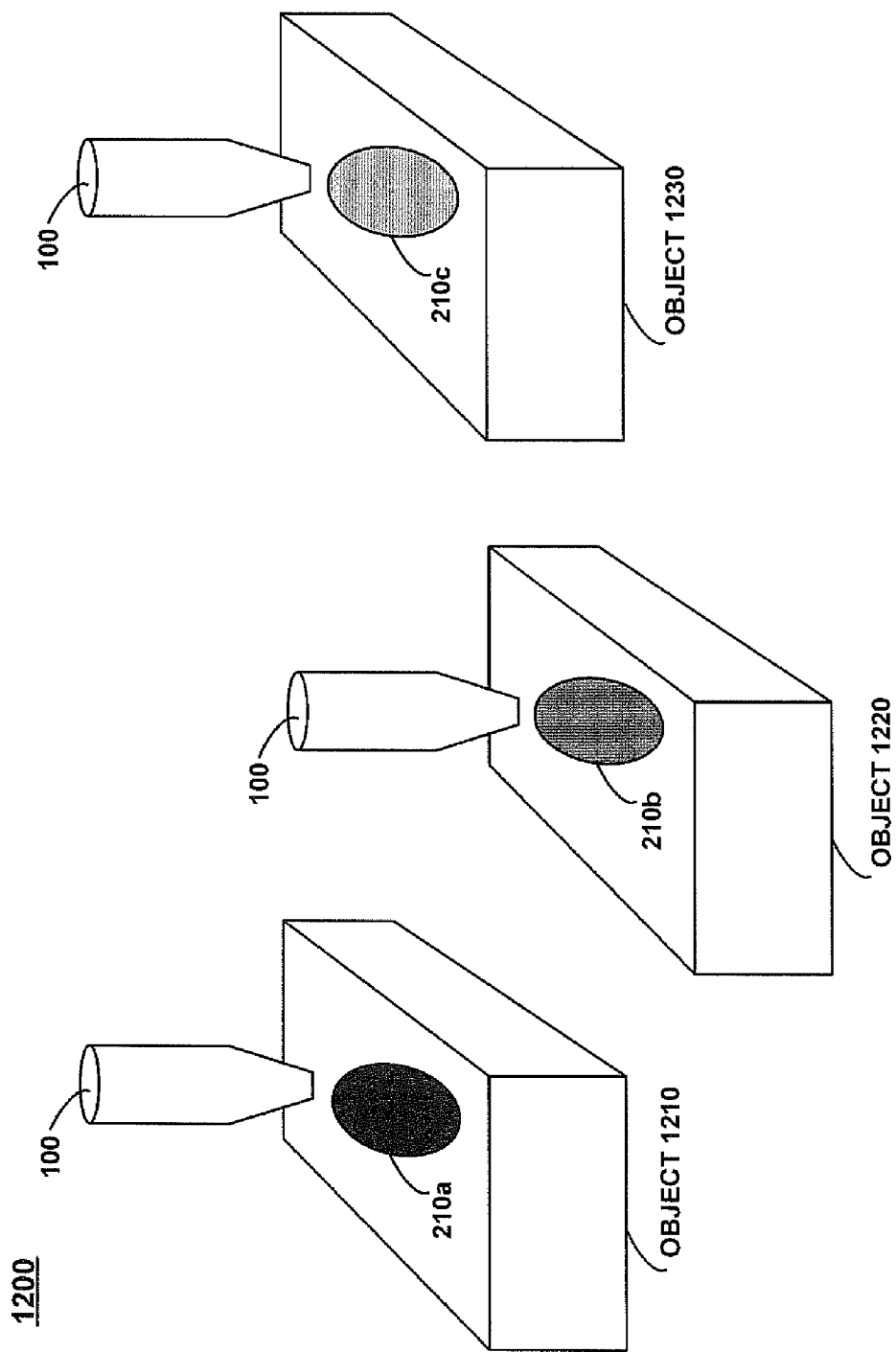
FIG. 12 shows an array of multiple exemplary objects with colored regions for recognition by an exemplary interface device in accordance with one embodiment of the present invention.

FIG. 12 shows array 1200 of multiple exemplary objects with colored regions for recognition by an exemplary interface device in accordance with one embodiment of the present invention. As shown in FIG. 12, objects 1210-1230 comprise surfaces with respective colored regions (e.g., 210a, 210b and 210c). Each colored region may represent a different color and be associated with a different object and/or object characteristic (e.g., a side of the object, etc.) as depicted in FIG. 12. As such, when device 100 is brought into proximity of (e.g., placed over) a given colored region (e.g., 210a, 210b or 210c), the color of the region may be determined (e.g., as discussed above with respect to the prior Figures). The determined color may then be used to identify an object, object characteristic, etc. (e.g., by accessing color-coded information comprising object identification information and/or object characteristic information associated with the determined color).

In one embodiment, objects 1210-1230 may represent different pages of a printed material (e.g., a book, magazine, electronic book, educational tool for children, etc.), where each page comprises a colored region (e.g., 210a, 210b and 210c, respectively). As such, color determination of each region may identify a page number of the printed material, where the color coding information used to determine the page number may be stored in a memory (e.g., 150) of device 100.

In another embodiment, regions 210a-210c may represent stickers applied to objects 1210-1230. As such, the objects may be color-coded using the stickers, thereby enabling subsequent identification of the objects by device 100. In one embodiment, device 100 may be programmed (e.g., by a user, automatically, etc.) to associate a given colored region with a given object to facilitate the identification.

Although FIG. 12 shows only three objects (e.g., 1210-1230) with colored regions, it should be appreciated that a larger or smaller number of objects with colored regions may be used in other embodiments. Additionally, it should be appreciated that more than one colored region may be associated with an object and/or an object characteristic in other embodiments. And in another embodiment, objects 1210-1230 may comprise one or more alternative shapes (e.g., spheres, cones, cylinders, etc.), where at least one object may have a shape which is different from other objects comprising colored regions.

Figure 13:
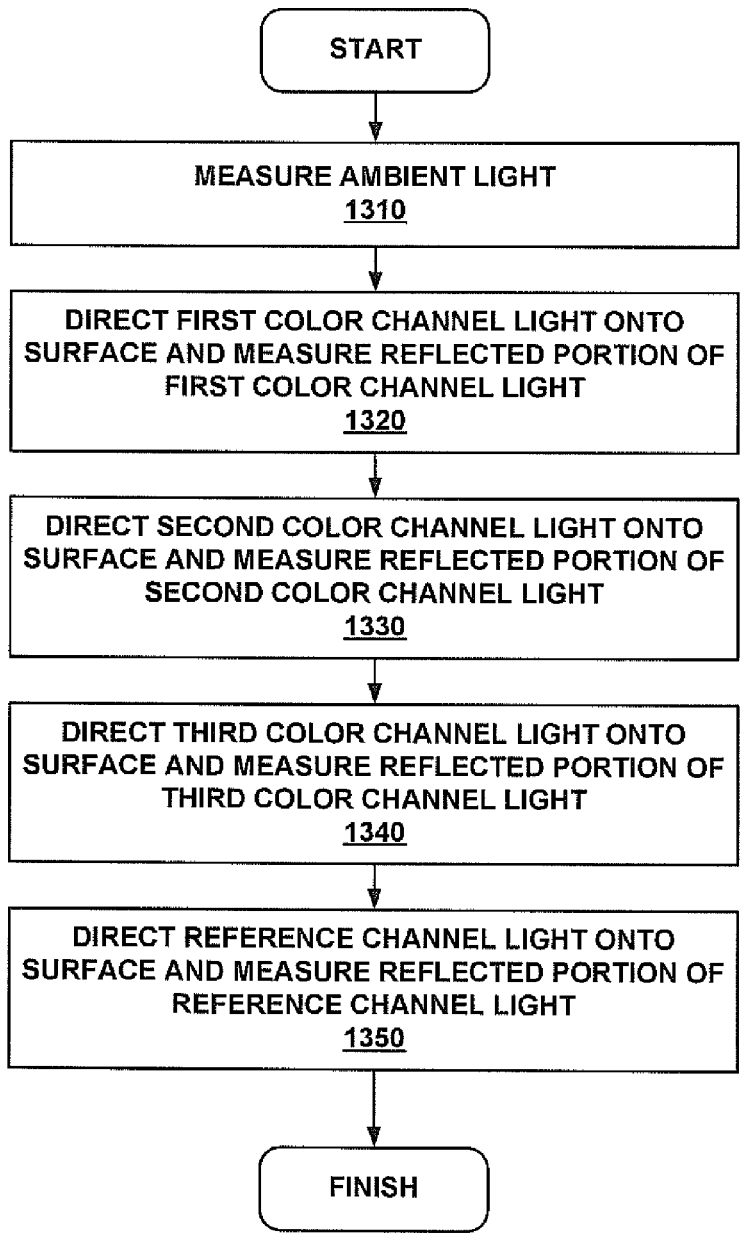
FIG. 13 shows an exemplary process for performing color measurements on a surface in accordance with one embodiment of the present invention.

FIG. 13 shows exemplary process 1300 for performing color measurements on a surface in accordance with one embodiment of the present invention. As shown in FIG. 13, step 1310 involves measuring the ambient light. The ambient light may be measured by a sensor (e.g., 130) without the direction of additional light (e.g., by light source 120), thereby generating an ambient light measurement signal.

Step 1320 involves directing a first color channel light onto a surface (e.g., 220) and measuring the reflected portion of the first color channel light. The light (e.g., red, green, blue, etc.) may be emitted from a light source (e.g., 120) and measured by a sensor (e.g., 130) as discusses above with respect to prior figures. Additionally, the light may be passed through one or more optical components (e.g., 140a, 140b, lens 340a, lens 340b, filter 445a, filter 445b, etc.) to affect the measurement of the light (e.g., by sensor 130). For example, the light may be focused, filtered, separated, diffused, channeled, offset, etc. In response to measurement of the reflected portion of the first color channel light, a first color channel measurement signal may be generated (e.g., representing the intensity of the reflected portion of the light).

As shown in FIG. 13, step 1330 involves directing a second color channel light onto a surface (e.g., 220) and measuring the reflected portion of the second color channel light. The light (e.g., red, green, blue, etc.) may be emitted from a light source (e.g., 120) and measured by a sensor (e.g., 130) as discusses above with respect to prior figures. Additionally, the light may be passed through one or more optical components (e.g., 140a, 140b, lens 340a, lens 340b, filter 445a, filter 445b, etc.) to affect the measurement of the light (e.g., by sensor 130). For example, the light may be focused, filtered, separated, diffused, channeled, offset, etc. In response to measurement of the reflected portion of the second color channel light, a second color channel measurement signal may be generated (e.g., representing the intensity of the reflected portion of the light).

Step 1340 involves directing a third color channel light onto a surface (e.g., 220) and measuring the reflected portion of the third color channel light. The light (e.g., red, green, blue, etc.) may be emitted from a light source (e.g., 120) and measured by a sensor (e.g., 130) as discusses above with respect to prior figures. Additionally, the light may be passed through one or more optical components (e.g., 140a, 140b, lens 340a, lens 340b, filter 445a, filter 445b, etc.) to affect the measurement of the light (e.g., by sensor 130). For example, the light may be focused, filtered, separated, diffused, channeled, offset, etc. In response to measurement of the reflected portion of the third color channel light, a third color channel measurement signal may be generated (e.g., representing the intensity of the reflected portion of the light).

As shown in FIG. 13, step 1350 involves directing a reference channel light onto a surface (e.g., 220) and measuring the reflected portion of the reference channel light. The light (e.g., IR) may be emitted from a light source (e.g., 120) and measured by a sensor (e.g., 130) as discusses above with respect to prior figures. Additionally, the light may be passed through one or more optical components (e.g., 140a, 140b, lens 340a, lens 340b, filter 445a, filter 445b, etc.) to affect the measurement of the light (e.g., by sensor 130). For example, the light may be focused, filtered, separated, diffused, channeled, offset, etc. In response to measurement of the reflected portion of the reference channel light, a reference channel measurement signal may be generated (e.g., representing the intensity of the reflected portion of the light).

Although FIG. 13 discusses the measurement of light from only three color channels, it should be appreciated that a larger or smaller number of color channels may be measured and/or used to determine the color of a colored region in other embodiments. Further, although process 1300 includes steps for measuring ambient light and light from a reference channel, one or both of these steps may be omitted in other embodiments.

Figure 14:
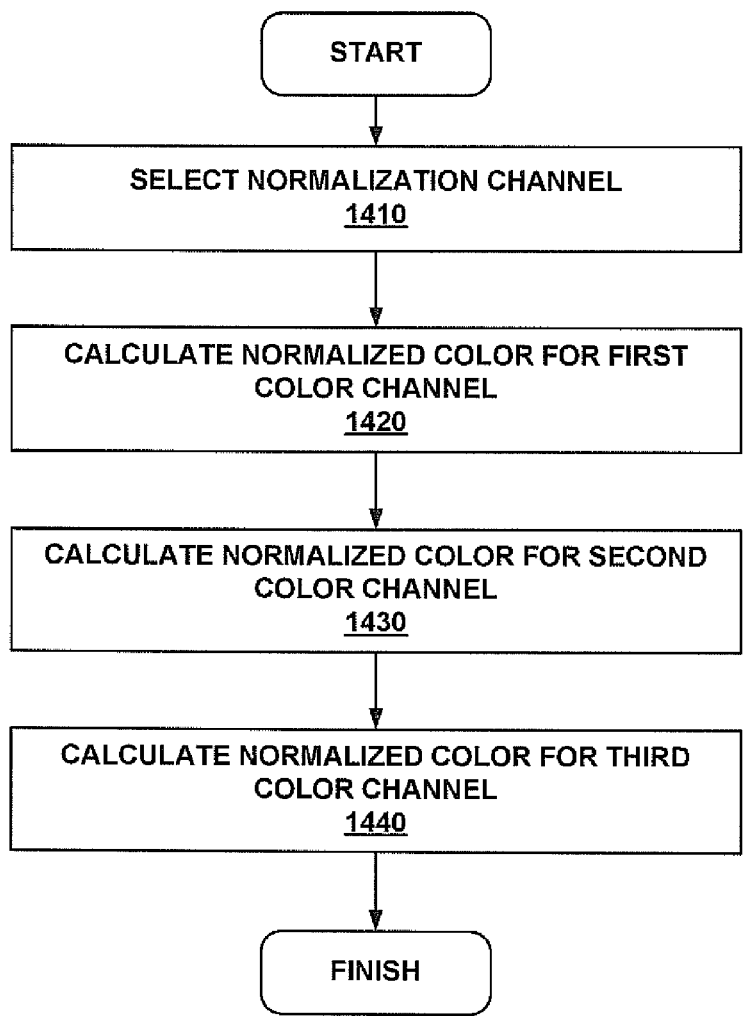
FIG. 14 shows an exemplary process for normalizing color measurements in accordance with one embodiment of the present invention.

FIG. 14 shows exemplary process 1400 for normalizing color measurements in accordance with one embodiment of the present invention. As shown in FIG. 14, step 1410 involves selecting a normalization channel. The normalization channel is that used to perform normalization calculations on one or more color channel measurements, where normalization may help to adjust the color channel measurements to account for variations in angle and/or distance of an interface device (e.g., 100) with respect to a colored region (e.g., 210) for which a color determination it to be performed. In one embodiment, a reference channel may be used as the normalization channel. Alternatively, a color channel may be used as the normalization channel.

Step 1420 involves calculating a normalized color for a first color channel. Where the reference channel is selected as the normalization channel (e.g., in step 1410), the normalized color measurement $C_N$ for the first color channel may be calculated using the formula $$C_N = \frac{C - A}{R - A}$$

where C is the color measurement (e.g., obtained in step 1320 of process 1300) for the first color channel, A is the ambient light measurement (e.g., obtained in step 1310 of process 1300), and R is the reference channel measurement (e.g., obtained in step 1350 of process 1300). Alternatively, where a color channel is selected as the normalization channel (e.g., in step 1410), the normalized color measurement $C_N$ for the first color channel may be calculated using the formula $$C_N = \frac{C - A}{C_X - A}$$

where C is the color measurement (e.g., obtained in step 1320 of process 1300) for the first color channel, A is the ambient light measurement (e.g., obtained in step 1310 of process 1300), and $C_X$ is one of the channel measurements (e.g., obtained in step 1320, 1330 or 1340 of process 1300). And in other embodiments, the color measurements may be normalized according to other formulas.

As shown in FIG. 14, step 1430 involves calculating a normalized color for a second color channel. The normalized color measurement $C_N$ for the second color channel may be calculated analogously to that of the first color channel in step 1420 as discussed above. However, C should instead represent the color measurement (e.g., obtained in step 1330 of process 1300) for the second color channel. And in other embodiments, the color measurements may be normalized according to other formulas.

Step 1440 involves calculating a normalized color for a third color channel. The normalized color measurement $C_N$ for the third color channel may be calculated analogously to that of the first color channel in step 1420 as discussed above. However, C should instead represent the color measurement (e.g., obtained in step 1340 of process 1300) for the third color channel. And in other embodiments, the color measurements may be normalized according to other formulas.

Although FIG. 14 discusses the color measurement normalization of only three color channels, it should be appreciated that color measurements of a larger or smaller number of color channels may be normalized in other embodiments. Further, although process 1400 includes step 1410 for selecting a normalization channel, it should be appreciated that this step may be omitted in other embodiments (e.g., where a normalization channel is predetermined, where a dedicated normalization channel is provided, etc.).

Figure 15:
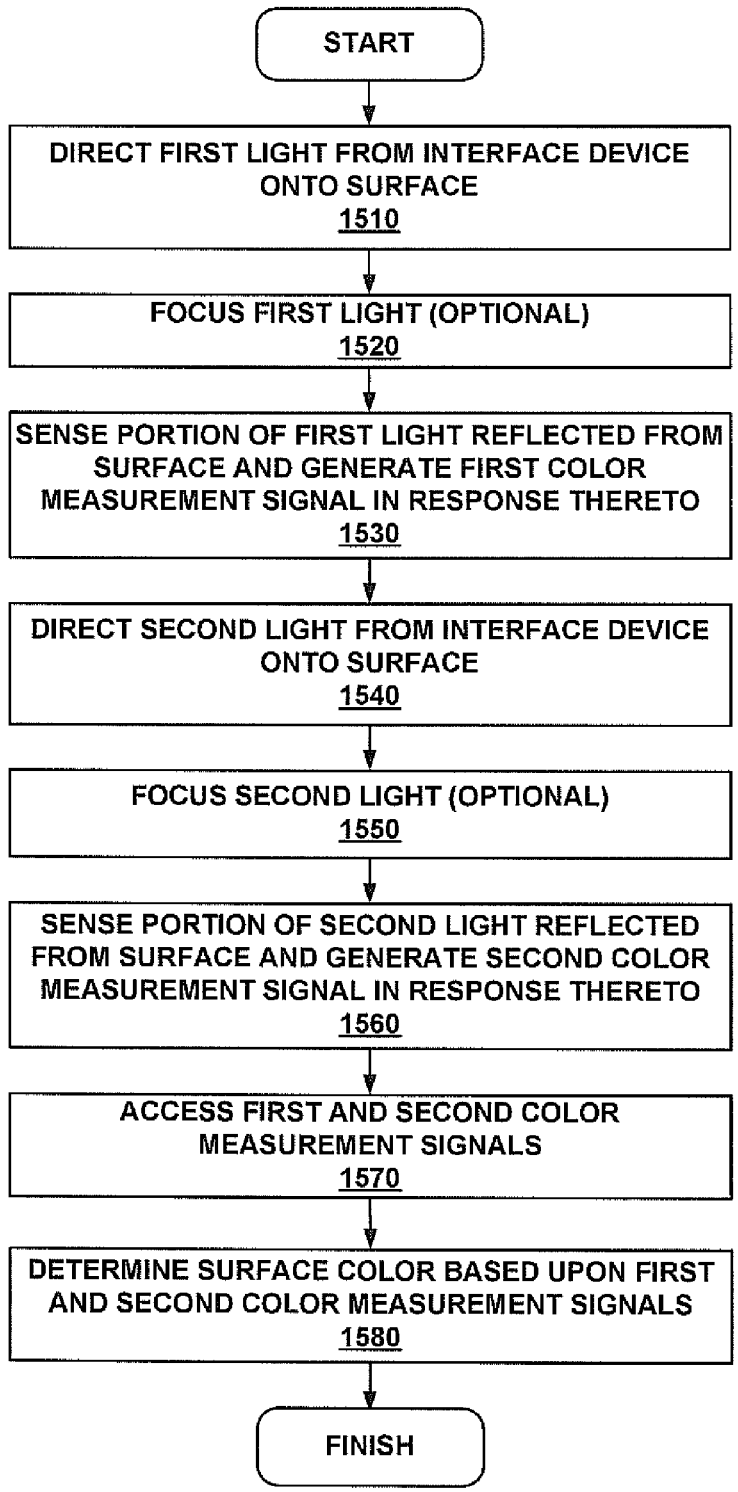
FIG. 15 shows an exemplary process for determining a color of a surface using an interface device in accordance with one embodiment of the present invention.

FIG. 15 shows an exemplary process for determining a color of a surface using an interface device in accordance with one embodiment of the present invention. As shown in FIG. 15, step 1510 involves directing a first light from an interface device (e.g., 100) onto a surface. The surface may be a color-coded medium (e.g., 220 of FIGS. 2-7) with at least one colored region (e.g., 210 of FIGS. 2-7), where the surface may be flat, spherical, or alternatively shaped/contoured. The light may be generated by a light source (e.g., 120) capable of emitting a single color and/or multiple colors in sequential fashion. Additionally, the first light may be a color (e.g., red, green or blue) of a color system (e.g., RGB) used to determine the color of the surface.

Step 1520 involves optionally focusing the first light. The light may be focused before and/or after reflection off the surface by an optical component (e.g., 140*a* and/or 140*b*). As such, adjustment may be made for colored regions of different sizes, different operating distances between the interface device (e.g., 100) and a colored region, etc. Additionally, focusing the first light may vary the ability of the interface device (e.g., 100) to detect variations in color on the surface by changing the area of illumination and/or the intensity of the illumination of the light output from the interface device, thereby adjusting the accuracy and/or sensitivity of the interface device. Additionally, the focusing may adjust the accuracy and/or sensitivity of components (e.g., sensor 130) of the interface device for sensing the reflected portion of the first light from the surface.

As shown in FIG. 15, step 1530 involves sensing a portion of the first light reflected from the surface and generating a first color measurement signal in response thereto. The reflected light may be sensed by a sensor (e.g., 130) of the interface device (e.g., 100). In response, the sensor, either alone or in combination with other components (e.g., 135) of the interface device (e.g., 100), may generate a first color measurement signal. The first color measurement signal may indicate an intensity of the reflected light.

Step 1540 involves directing a second light from an interface device (e.g., 100) onto the surface. The second light may be a color (e.g., red, green or blue) of a color system (e.g., RGB) used to determine the color of the surface, where the color of the second light may be different from that of the first light. The second light may be directed analogously to the first light in step 1510.

Step 1550 involves optionally focusing the second light. The second light may be focused analogously to the first light in step 1520.

As shown in FIG. 15, step 1560 involves sensing a portion of the second light reflected from the surface and generating a second color measurement signal in response thereto. The sensing and generating associated with the second light may be performed analogously to that of the first light in step 1530.

Step 1570 involves accessing the first and second color measurement signals. Thereafter, the color of the surface may be determined in step 1580 based upon the first and second color measurement signals. In one embodiment, the relative intensities of the color channel measurement signals may determine the color of the surface. Alternatively, a processor (e.g., 110) of the interface device (e.g., 100) may access additional information (e.g., stored in memory 150, memory 165, etc.) and/or perform additional processing using the first and second color measurement signals to determine the color of the surface.

Figure 16A:
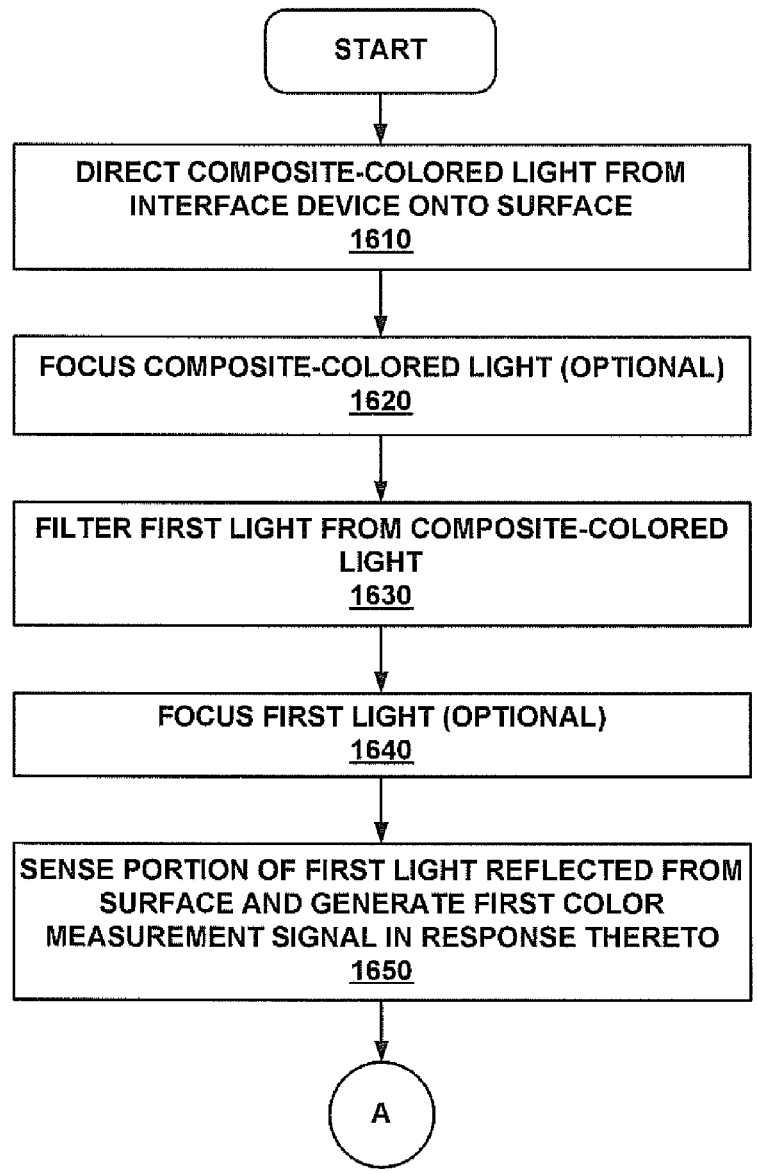
FIG. 16A shows a first portion of an exemplary process for determining a color of a surface using an interface device with a composite-colored light in accordance with one embodiment of the present invention.
Figure 16B:
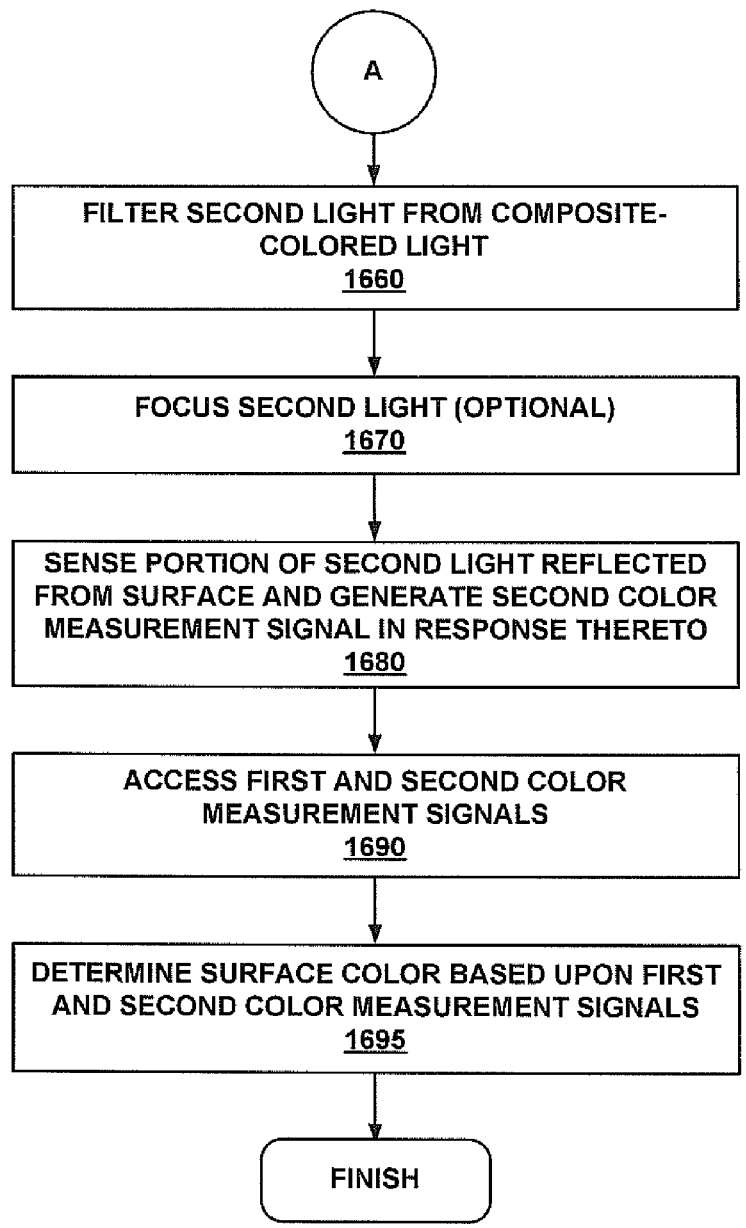
FIG. 16B shows a second portion of an exemplary process for determining a color of a surface using an interface device with a composite-colored light in accordance with one embodiment of the present invention.

FIGS. 16A and 16B show exemplary process 1600 for determining a color of a surface using an interface device with a composite-colored light in accordance with one embodiment of the present invention. As shown in FIG. 16A, step 1610 involves directing composite-colored light from an interface device (e.g., 100) onto a surface. The surface may be a color-coded medium (e.g., 220 of FIGS. 2-7) with at least one colored region (e.g., 210 of FIGS. 2-7), where the surface may be flat, spherical, or alternatively shaped/contoured. The light may be generated by a light source (e.g., 120) capable of emitting a composite-colored (e.g., white) light comprising more than one color. In one embodiment, the composite-colored light may comprise each color (e.g., red, green and blue) of a color system (e.g., RGB) used to determine the color of the surface.

Step 1620 involves optionally focusing the composite-colored light. The light may be focused before and/or after reflection off the surface by an optical component (e.g., 140*a* and/or 140*b*). As such, adjustment may be made for colored regions of different sizes, different operating distances between the interface device (e.g., 100) and a colored region, etc. Additionally, focusing the first light may vary the ability of the interface device (e.g., 100) to detect variations in color on the surface by changing the area of illumination and/or the intensity of the illumination of the light output from the interface device, thereby adjusting the accuracy and/or sensitivity of the interface device. Additionally, the focusing may adjust the accuracy and/or sensitivity of components (e.g., sensor 130) of the interface device for sensing the reflected portion of the first light from the surface.

Step 1630 involves filtering a first light from the composite-colored light. The first light may be a color (e.g., red, green or blue) of a color system (e.g., RGB) used to determine the color of the surface. The composite-colored light may be filtered before and/or after reflection off the surface by an optical component (e.g., 140*a* and/or 140*b*). If filtered before reflection off the colored surface, then only the first light will reflect off the surface. If filtered after reflection, then the composite-colored light will reflect off the surface.

After filtering the first light from the composite-colored light, the first light may be optionally focused in step 1640. The first light may be focused analogously to the composite-colored light in step 1620.

As shown in FIG. 16A, step 1650 involves sensing a portion of the first light reflected from the surface and generating a first color measurement signal in response thereto. The reflected light may be sensed by a sensor (e.g., 130) of the interface device (e.g., 100). In response, the sensor, either alone or in combination with other components (e.g., 135) of the interface device (e.g., 100), may generate a first color measurement signal. The first color measurement signal may indicate an intensity of the reflected light.

As shown in FIG. 16B, step 1660 involves filtering a second light from the composite-colored light. The second light may be a color (e.g., red, green or blue) of a color system (e.g., RGB) used to determine the color of the surface, where the color of the second light may be different from that of the first light. The second light may be filtered from the composite-colored light analogously to the filtering of the first light in step 1630.

After filtering the second light from the composite-colored light, the first light may be optionally focused in step 1670. The second light may be focused analogously to the composite-colored light in step 1620.

As shown in FIG. 16B, step 1680 involves sensing a portion of the second light reflected from the surface and generating a second color measurement signal in response thereto. The sensing and generating associated with the second light may be performed analogously to that of the first light in step 1650.

Step 1690 involves accessing the first and second color measurement signals. Thereafter, the color of the surface may be determined in step 1695 based upon the first and second color measurement signals. In one embodiment, the relative intensities of the color channel measurement signals may determine the color of the surface. Alternatively, a processor (e.g., 110) of the interface device (e.g., 100) may access additional information (e.g., stored in memory 150, memory 165, etc.) and/or perform additional processing using the first and second color measurement signals to determine the color of the surface.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A peripheral interface device comprising:
    at least one light source for directing a first light and a second light from said peripheral interface device onto a surface, wherein said first light comprises a first color, and wherein said second light comprises a second color;
    at least one sensor for sensing a first reflected light comprising a portion of said first light reflected from said surface, wherein said at least one sensor is operable to generate a first color measurement signal indicating an intensity of said first reflected light, said at least one sensor further for sensing a second reflected light comprising a portion of said second light reflected from said surface, and wherein said at least one sensor is further operable to generate a second color measurement signal indicating an intensity of said second reflected light; and
    a processor for accessing said first and second color measurement signals and determining a color coding of said surface based upon a relationship of said intensity of said first reflected light to said intensity of said second reflected light, and wherein said processor is further operable to determine a position of said at least one sensor with respect to said surface.

2. The peripheral interface device of claim 1, wherein said processor is further operable to determine said position based upon said color coding.

3. The peripheral interface device of claim 2, wherein said processor is further operable to access content associated with said position.

4. The peripheral interface device of claim 3 further comprising an output device configured to render an output associated with said content.

5. The peripheral interface device of claim 1, wherein said color coding comprises a plurality of discrete colored dots.

6. The peripheral interface device of claim 5, wherein said plurality of discrete color dots comprise at least one dot of a first color and at least one dot of a second color.

7. The peripheral interface device of claim 1, wherein said surface comprises a page of a printed material, and wherein said processor is further configured to identify a page number associated with said color coding.

8. The peripheral interface device of claim 1, wherein said surface comprises a sticker for placement on an item, and wherein said processor is further configured to identify said item based upon said color coding.

9. The peripheral interface device of claim 1, wherein said at least one light source comprises a light emitting diode (LED).

10. The peripheral interface device of claim 1, wherein said at least one light source comprises at least one light source selected from a group consisting of a red light source, a green light source and a blue light source.

11. The peripheral interface device of claim 1 further comprising:
    a filter; and
    wherein said at least one light source comprises a white light source configured to generate white light, wherein said filter filters said second light from said white light during generation of said first color measurement signal, and wherein said filter filters said first light from said white light during generation of said second color measurement signal.

12. The peripheral interface device of claim 1 further comprising:
    a lens for focusing light selected from a group consisting of said first light and said second light, wherein said lens is further configured to adjust a surface area of said surface used to determine said color coding of said surface.

13. The peripheral interface device of claim 1, wherein said at least one sensor is operable to sense ambient lighting conditions and generate an ambient light measurement signal in response thereto, and wherein said ambient light measurement signal is applied to said first and second color measurement signals to account for ambient light variations when determining said color coding of said surface.

14. The peripheral interface device of claim 1, wherein said at least one light source is further operable to direct an infrared (IR) signal onto said surface, wherein said at least one sensor is operable to sense a portion of said IR signal reflected from said surface and generate a reference measurement signal in response thereto, wherein said reference measurement signal is applied to said first and second color measurement signals for normalization thereof, wherein said normalization compensates for variations when determining said color coding of said surface, and wherein said variations are selected from a group consisting of: variations in angle of said peripheral interface device with respect to said surface; and variations in distance of said peripheral interface device with respect to said surface.

15. The peripheral interface device of claim 1, wherein said first color measurement signal is applied to said second color measurement signal for normalization thereof, wherein said normalization compensates for variations when determining said color coding of said surface, and wherein said variations are selected from a group consisting of: variations in angle of said peripheral interface device with respect to said surface; and
    variations in distance of said peripheral interface device with respect to said surface.

16. The peripheral interface device of claim 1, wherein said processor is further configured to determine an object comprising said surface based upon said color coding information.

17. A method for determining a position on a surface using a peripheral interface device, said method comprising:
    directing a first light from said peripheral interface device onto said surface, wherein said first light comprises a first color;
    in response to sensing a first reflected light, generating a first color measurement signal corresponding to an intensity of said first reflected light, wherein said first reflected light comprises a reflection of said first light from said surface;
    directing a second light from said peripheral interface device onto said surface, wherein said second light comprises a second color;
    in response to sensing a second reflected light, generating a second color measurement signal corresponding to an intensity of said second reflected light, wherein said second reflected light comprises a reflection of said second light from said surface;
    accessing said first and second color measurement signals;
    determining a color coding of said surface based upon a relationship of said intensity of said first reflected light to said intensity of said second reflected light; and determining a position of said peripheral interface device with respect to said surface.

18. The method of claim 17, wherein said determining further comprises determining said position of said peripheral interface device with respect to said surface based upon said color coding.

19. The method of claim 18 further comprising:
accessing content associated with said position.

20. The method of claim 19 further comprising:
rendering an output associated with said content.

21. The method of claim 17, wherein said color coding comprises a plurality of discrete colored dots.

22. The method of claim 21, wherein said plurality of discrete color dots comprise at least one dot of a first color and at least one dot of a second color.

23. The method of claim 17, wherein said surface comprises a page of a printed material, and further comprising:
identifying a page number associated with said color coding.

24. The method of claim 17, wherein said surface comprises a sticker for placement on an item, and further comprising:
identifying said item based upon said color coding.

25. The method of claim 17, wherein said directing a first light further comprises generating said first light using a light source selected from a group consisting of a light emitting diode (LED), a red light source, a green light source and a blue light source.

26. The method of claim 17, wherein said directing a second light further comprises generating said second light using a light source selected from a group consisting of a light emitting diode (LED), a red light source, a green light source and a blue light source.

27. The method of claim 17, wherein said directing a first light further comprises generating said first light using a white light source, wherein said directing a second light further comprises generating said second light using said white light source, and further comprising:
filtering said second light from said white light during generation of said first color measurement signal; and
filtering said first light from said white light during generation of said second color measurement signal.

28. The method of claim 17 further comprising:
focusing light selected from a group consisting of said first light and said second light, wherein said focusing further comprises adjusting a surface area of said surface used to determine said color coding of said surface.

29. The method of claim 17 further comprising:
sensing ambient lighting conditions;
generating an ambient light measurement signal in response to said sensing; and
applying said ambient light measurement signal to said first and second color measurement signals to account for ambient light variations when determining said color coding of said surface.

30. The method of claim 17 further comprising:
directing an infrared (IR) signal onto said surface;
sensing a reflected IR signal, wherein said reflected IR signal comprises a reflection of said IR signal from said surface;
generating a reference measurement signal in response to said sensing; and
applying said reference measurement signal to said first and second color measurement signals for normalization thereof, wherein said normalization compensates for variations when determining said color coding of said surface, and wherein said variations are selected from a group consisting of: variations in angle of said peripheral interface device with respect to said surface; and variations in distance of said peripheral interface device with respect to said surface.

31. The method of claim 17 further comprising:
applying said first color measurement signal to said second color measurement signal for normalization thereof, wherein said normalization compensates for variations when determining said color coding of said surface, and wherein said variations are selected from a group consisting of: variations in angle of said peripheral interface device with respect to said surface; and variations in distance of said peripheral interface device with respect to said surface.

32. The method of claim 17 further comprising:
determining an object comprising said surface based upon said color coding information.

* * * * *